United States Patent
Maiti et al.

(10) Patent No.: US 11,023,472 B2
(45) Date of Patent: Jun. 1, 2021

(54) SYSTEM AND METHOD FOR TROUBLESHOOTING IN A VIRTUAL COMPUTING SYSTEM

(71) Applicant: Nutanix, Inc., San Jose, CA (US)

(72) Inventors: Atreyee Maiti, San Jose, CA (US); Bryan Crowe, San Jose, CA (US); Harry Yang, San Jose, CA (US); Himanshu Shukla, San Jose, CA (US); Rahul Singh, San Jose, CA (US); Shamita Pisal, San Jose, CA (US); Shyan-Ming Perng, San Jose, CA (US); Shyama Duriseti, Pleasanton, CA (US)

(73) Assignee: Nutanix, Inc., San Jose, CA (US)

( * ) Notice: Subject to any disclaimer, the term of this patent is extended or adjusted under 35 U.S.C. 154(b) by 464 days.

(21) Appl. No.: 15/906,076

(22) Filed: Feb. 27, 2018

(65) Prior Publication Data
US 2019/0266253 A1  Aug. 29, 2019

(51) Int. Cl.
*G06F 16/2457* (2019.01)
*G06F 11/07* (2006.01)
(Continued)

(52) U.S. Cl.
CPC ...... *G06F 16/24578* (2019.01); *G06F 11/079* (2013.01); *G06F 11/0712* (2013.01);
(Continued)

(58) Field of Classification Search
CPC ............. G06F 16/243; G06F 16/24578; G06F 16/248; G06F 11/0709; G06F 11/0712; G06F 11/0751; G06F 11/079; G06F 11/0793; G06F 16/901; G06F 16/9024; G06Q 30/016; H04L 41/5074
See application file for complete search history.

(56) References Cited

U.S. PATENT DOCUMENTS 5,428,737 A  6/1995 Li et al.
5,661,668 A  8/1997 Yemini et al.
(Continued)

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
(Continued)

*Primary Examiner* — James E Richardson
(74) *Attorney, Agent, or Firm* — Foley & Lardner LLP

(57) ABSTRACT

A system and method include receiving, by a troubleshooting system of a virtual computing system, a search query for troubleshooting a problem associated with a component of the virtual computing system. The search query is received via a troubleshooting interface of the troubleshooting system. The system and method also include parsing the search query, including associating a troubleshooting category with the parsed search query, determining possible causes of the problem from the troubleshooting category, and ranking the possible causes based on a pre-determined criteria. The system and method additionally include displaying a subset of highest ranked possible causes of the problem on the troubleshooting interface.

34 Claims, 12 Drawing Sheets

(51) Int. Cl.
*G06F 16/248* (2019.01)
*G06F 16/901* (2019.01)

(52) U.S. Cl.
CPC ........ *G06F 11/0751* (2013.01); *G06F 16/248* (2019.01); *G06F 16/9024* (2019.01)

(56) References Cited

U.S. PATENT DOCUMENTS

| | | | |
|---|---|---|---|
| 6,463,441 B1* | 10/2002 | Paradies | G06Q 10/10 |
| 6,681,344 B1 | 1/2004 | Andrew | |
| 7,051,023 B2 | 5/2006 | Kapur et al. | |
| 7,107,185 B1 | 9/2006 | Yemini et al. | |
| 7,237,266 B2 | 6/2007 | Aaron | |
| 7,346,629 B2 | 3/2008 | Kapur et al. | |
| 7,385,716 B1* | 6/2008 | Skaanning | G06F 11/0733 358/1.14 |
| 7,836,039 B2 | 11/2010 | Clark et al. | |
| 7,953,746 B1 | 5/2011 | Garg et al. | |
| 8,090,724 B1 | 1/2012 | Welch et al. | |
| 8,299,943 B2 | 10/2012 | Longe | |
| 8,549,518 B1 | 10/2013 | Aron et al. | |
| 8,601,473 B1 | 12/2013 | Aron et al. | |
| 8,738,972 B1 | 5/2014 | Bakman et al. | |
| 8,751,867 B2 | 6/2014 | Marvasti et al. | |
| 8,775,411 B1 | 7/2014 | Ransil et al. | |
| 8,850,130 B1 | 9/2014 | Aron et al. | |
| 9,417,757 B1* | 8/2016 | Caiani | G06F 3/048 |
| 9,542,450 B1 | 1/2017 | Jacobsson | |
| 9,772,866 B1 | 9/2017 | Aron et al. | |
| 9,871,714 B2 | 1/2018 | Brewer | |
| 9,881,066 B1 | 1/2018 | Yousaf et al. | |
| 9,882,798 B2 | 1/2018 | Padala et al. | |
| 10,198,511 B1 | 2/2019 | Gupta et al. | |
| 10,445,328 B2 | 10/2019 | Zhou et al. | |
| 2002/0093527 A1 | 7/2002 | Sherlock et al. | |
| 2003/0065986 A1* | 4/2003 | Fraenkel | G06F 11/3089 714/47.2 |
| 2004/0250166 A1* | 12/2004 | Dahlquist | G05B 23/0278 714/37 |
| 2007/0027801 A1 | 2/2007 | Botzer et al. | |
| 2007/0266002 A1 | 11/2007 | Chowdhury et al. | |
| 2008/0082569 A1 | 4/2008 | Mansour et al. | |
| 2008/0091408 A1 | 4/2008 | Roulland et al. | |
| 2008/0263009 A1 | 10/2008 | Buettner et al. | |
| 2009/0064053 A1 | 3/2009 | Crawford et al. | |
| 2010/0114561 A1 | 5/2010 | Yasin | |
| 2010/0306191 A1 | 12/2010 | Lebeau et al. | |
| 2011/0010326 A1 | 1/2011 | Neale et al. | |
| 2011/0019316 A1 | 1/2011 | Zhan et al. | |
| 2011/0055699 A1* | 3/2011 | Li | G06F 16/951 715/709 |
| 2011/0087644 A1 | 4/2011 | Frieden et al. | |
| 2011/0131242 A1 | 6/2011 | Bent et al. | |
| 2011/0191316 A1 | 8/2011 | Lai et al. | |
| 2011/0219015 A1 | 9/2011 | Kim et al. | |
| 2011/0295788 A1 | 12/2011 | Kowalski | |
| 2011/0307219 A1 | 12/2011 | Szemkus et al. | |
| 2012/0005611 A1 | 1/2012 | Wey et al. | |
| 2012/0066547 A1* | 3/2012 | Gilbert | H04L 41/5074 714/26 |
| 2012/0296927 A1 | 11/2012 | Velipasaoglu et al. | |
| 2013/0014086 A1 | 1/2013 | McFadden et al. | |
| 2013/0124571 A1 | 5/2013 | Yasufuku | |
| 2013/0138646 A1 | 5/2013 | Sirer et al. | |
| 2013/0304725 A1 | 11/2013 | Nee et al. | |
| 2014/0032753 A1 | 1/2014 | Watanabe et al. | |
| 2014/0129536 A1 | 5/2014 | Anand et al. | |
| 2014/0188899 A1 | 7/2014 | Whitnah et al. | |
| 2014/0229462 A1 | 8/2014 | Lo | |
| 2014/0310222 A1* | 10/2014 | Davlos | G06F 11/2294 706/46 |
| 2014/0365522 A1 | 12/2014 | Soundararajan et al. | |
| 2015/0244743 A1 | 8/2015 | Jagad et al. | |
| 2015/0288557 A1* | 10/2015 | Gates | G06F 11/3082 714/37 |
| 2015/0293830 A1* | 10/2015 | Bhide | G06F 9/45558 718/1 |
| 2015/0381409 A1 | 12/2015 | Margalit et al. | |
| 2016/0198043 A1 | 7/2016 | Kaminogo et al. | |
| 2016/0217381 A1 | 7/2016 | Bloomquist et al. | |
| 2016/0224666 A1 | 8/2016 | Horvitz et al. | |
| 2016/0275188 A1 | 9/2016 | Hewitt et al. | |
| 2016/0350763 A1* | 12/2016 | Avila | G06F 16/24578 |
| 2016/0359872 A1 | 12/2016 | Yadav et al. | |
| 2017/0017537 A1 | 1/2017 | Razin et al. | |
| 2017/0039281 A1 | 2/2017 | Venkata et al. | |
| 2017/0102988 A1 | 4/2017 | Purushothaman et al. | |
| 2017/0139987 A1 | 5/2017 | Weyerhaeuser et al. | |
| 2017/0140428 A1 | 5/2017 | Chakraborty et al. | |
| 2017/0169134 A1 | 6/2017 | Bingham et al. | |
| 2017/0201851 A1 | 7/2017 | Huang et al. | |
| 2017/0316006 A1 | 11/2017 | Shukla et al. | |
| 2018/0025083 A1 | 1/2018 | Agarwal et al. | |
| 2018/0089328 A1 | 3/2018 | Bath et al. | |
| 2018/0115469 A1* | 4/2018 | Erickson | H04L 43/062 |
| 2018/0246811 A1 | 8/2018 | Bonanno et al. | |
| 2018/0312180 A1* | 11/2018 | Wang | B61L 15/0081 |
| 2018/0351838 A1 | 12/2018 | Lui | |
| 2019/0188067 A1* | 6/2019 | Chen | G06F 11/079 |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Non-Final Office Action on U.S. Appl. No. 15/606,990 dated Apr. 22, 2019.
Non-Final Office Action on U.S. Appl. No. 15/653,762 dated May 1, 2019.
vRealize Operations Manager Best Practices, Supplemental Guide, Version 7.x, Sep. 2018, Version 1.4.
YouTube Video screenshots for VR Ops, VMware Cloud Management, VRealize Operations 6.6-Trouble Shoot a VM Dashboard, YouTube, Jul. 12, 2017, https://www.youtube.com/watch?v=kSiOUe80f2w&feature=youtu.be [youtube.com].
Turbonimic.com, Turbonomic_Solving_the_Right_Problem_in_the_Data_Center, Turbonic White Paper, 2015 Turbonomic, Inc.
International Search Report and Written Opinion for PCT/US2017/030256, dated Sep. 25, 2017.
Non-Final Office Action on U.S. Appl. No. 15/143,060 dated Apr. 18, 2018.
Cano, Ignacio, et al. "Curator: Self-Managing Storage for Enterprise Clusters" (Mar. 27, 2017), from https://www.usenix.org/conference/nsdi17/.
Application Performance "Demo of AppDynamics from Application Performance," (accessed Oct. 1, 2019) retrieved from https://www.youtube.com/watch?v=2wsqGtxhdiw (Published May 16, 2017).
Tech Field Day, "Turbonomic with Public Cloud, Hybrid Cloud, Containers with Mor Cohen-Tal," (accessed Oct. 1, 2019) retrieved from https://www.youtube.com/watch?v=od7_cYzqK28, (Published May 15, 2017).
The Nutanix Bible; from https://nutanixbible.com/; accessed on Jan. 12, 2016.
The Nutanix Bible; from https://nutanixbible.com/; accessed on Jun. 25, 2018.

(56) References Cited

OTHER PUBLICATIONS

The Nutanix Bible; from https://nutanixbible.com/; accessed on Jan. 3, 2017.
The Nutanix Bible; from https://nutanixbible.com/; accessed on Jan. 3, 2018.
The Nutanix Bible; from https://nutanixbible.com/; accessed on Sep. 4, 2015.
The Nutanix Bible; from https://nutanixbible.com/; accessed on Jan. 8, 2019.
The Nutanix Bible; from https://nutanixbible.com/; accessed on Jun. 8, 2017.
The Nutanix Bible; from https://nutanixbible.com/; accessed on Jun. 9, 2016.
vRealize Operations Manager Customization and Administration Guide, vRealize Operations Manager 6.1, EN-001857-02, VMware, 2016.
YouTube Video screenshots for DataDog, DataDog Overview, Youtube, Mar. 9, 2016, https://www.youtube.com/watch?v=0-YMPk4kdTo&feature=youtu.be [youtube.com].

\* cited by examiner

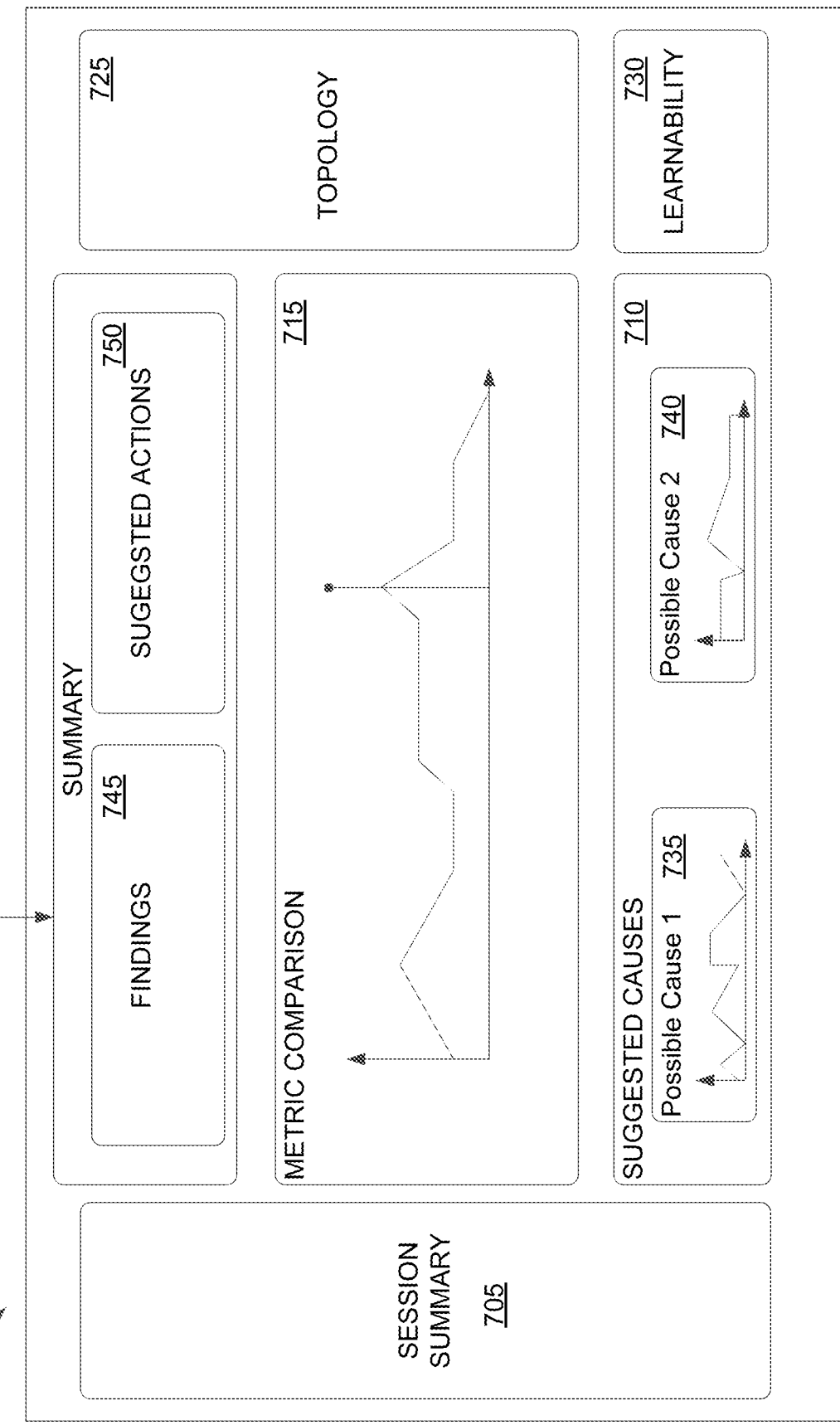

SYSTEM AND METHOD FOR TROUBLESHOOTING IN A VIRTUAL COMPUTING SYSTEM

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present day virtual computing systems have limitations due to their configuration and the way they operate.

SUMMARY

In accordance with some aspects of the present disclosure, a method is disclosed. The method includes receiving, by a troubleshooting system of a virtual computing system, a search query for troubleshooting a problem associated with a component of the virtual computing system. The search query is received via a troubleshooting interface of the troubleshooting system. The method also includes parsing, by the troubleshooting system, the search query, including associating a troubleshooting category with the parsed search query, determining, by the troubleshooting system, possible causes of the problem from the troubleshooting category, and ranking, by the troubleshooting system, the possible causes based on a pre-determined criteria. The method additionally includes displaying, by the troubleshooting system, a subset of highest ranked possible causes of the problem on the troubleshooting interface.

In accordance with another aspect of the present disclosure, a system is disclosed. The system includes a troubleshooting system of a virtual computing system having a database configured to store data related to possible causes of a problem associated with a component of the virtual computing system and a processing unit. The processing unit is configured to receive a search query for troubleshooting the problem. The search query is received via a troubleshooting interface of the troubleshooting system. The processing unit is also configured to parse the search query, including associating a troubleshooting category with the parsed search query, determine the possible causes of the problem from the troubleshooting category, rank the possible causes based on a pre-determined criteria, and display a subset of highest ranked possible causes of the problem on the troubleshooting interface.

In accordance with yet another aspect of the present disclosure, a non-transitory computer readable media with computer-executable instructions is disclosed. The instructions when executed by a processor of a troubleshooting system of a virtual computing system, cause the troubleshooting system to perform a process including receiving a search query for troubleshooting a problem associated with a component of the virtual computing system. The search query is received via a troubleshooting interface of the troubleshooting system. The process also includes parsing the search query, including associating a troubleshooting category with the parsed search query, determining possible causes of the problem from the troubleshooting category, ranking the possible causes based on a pre-determined criteria, and displaying a subset of highest ranked possible causes of the problem on the troubleshooting interface.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIG. 7 is an example troubleshooting interface that may be used to provide a guided troubleshooting workflow to a user, in accordance with some embodiments of the present disclosure.

Figure 1:
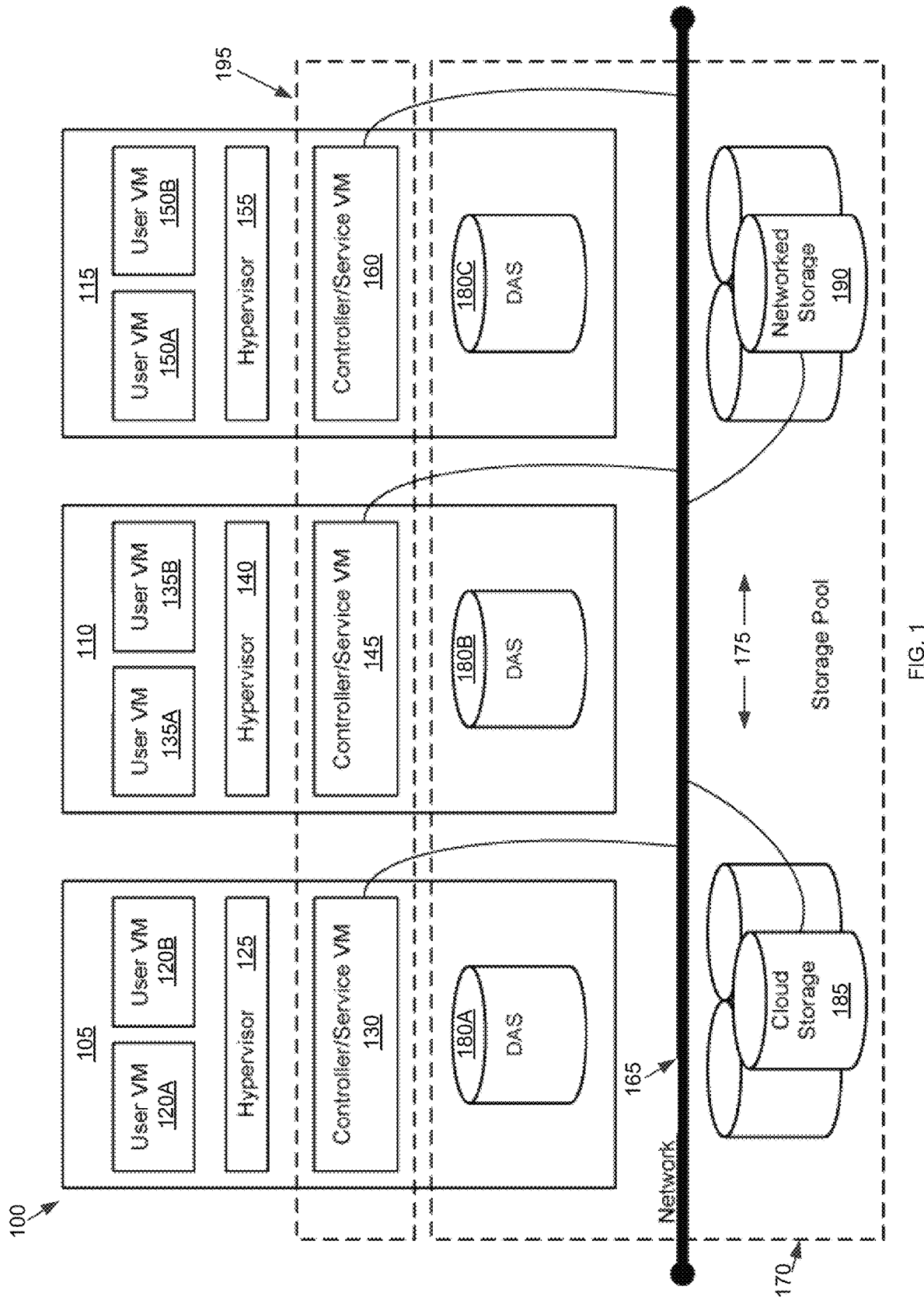
FIG. 1 is a block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is generally directed to a troubleshooting system and method in a virtual computing system having a plurality of clusters, with each cluster having a plurality of nodes. Each of the plurality of nodes includes one or more virtual machines managed by an instance of a hypervisor. When problems are encountered within any component of the virtual computing system, a user (e.g., an administrator) may perform a troubleshooting process that identifies the source of those problems and resolves those problems. Problems may arise due to a variety of reasons, including for example, failure or malfunction of a component, reduced performance (e.g., increases latency) of a component, and any other unexpected, undesirable, or abnormal behavior or operation of a component within the virtual computing system.

Conventionally, to troubleshoot a problem, a user performs a variety of tests to check for frequently encountered or easily tested problems before manually exploring/testing a variety of components to eliminate unlikely causes and possibly identify the source of the problem. Thus, the troubleshooting process using such a divide and conquer technique is time consuming and inefficient. In some other conventional mechanisms of troubleshooting, a troubleshooting system provides a user with any and all data related to all of the components being managed by the user. The user sifts through the data to look for possible causes of the problems. In yet other conventional mechanisms, the troubleshooting system provides the user with a standard list or checklist of actions to try, regardless of whether those actions are likely causes of the problem or not. All of these troubleshooting mechanisms are inefficient, time consuming, and adversely impact the performance of the component facing the problem (as well as adversely impacted the performance of other associated components) for longer periods of time.

With very large virtual computing environments, the troubleshooting inefficiencies and problems outlined above are exacerbated. In some cases, a user may manage thousands of components. The user cannot efficiently manage and troubleshoot large virtual computing environments using the conventional embodiments. Accordingly, a technical problem of effectively and timely troubleshooting a problem within a virtual computing environment, while minimizing the disruptions caused by the problem currently exists.

The present disclosure provides solutions. Specifically, the present disclosure provides a troubleshooting system, which identifies possible causes of a problem that a component within the virtual computing system is experiencing. From the possible causes, the troubleshooting system also identifies the most probable causes of the problems and presents those most probable causes to the user. By presenting only most probable causes of the problem, the troubleshooting system prevents the user from wasting time trying to explore/test unrelated causes and going through standard checklists. The troubleshooting system guides the user straight to the most likely cause of the problem, thereby effectively and timely troubleshooting the problem and minimizing the adverse performance impact on components. Thus, the troubleshooting system of the present disclosure overcomes the shortcomings of the conventional troubleshooting mechanisms, as explained in greater detail below.

Referring now to FIG. 1, a virtual computing system 100 is shown, in accordance with some embodiments of the present disclosure. The virtual computing system 100 includes a plurality of nodes, such as a first node 105, a second node 110, and a third node 115. Each of the first node 105, the second node 110, and the third node 115 may also be referred to as a "host" or "host machine." The first node 105 includes user virtual machines ("user VMs") 120A and 120B (collectively referred to herein as "user VMs 120"), a hypervisor 125 configured to create and run the user VMs, and a controller/service VM 130 configured to manage, route, and otherwise handle workflow requests between the various nodes of the virtual computing system 100. Similarly, the second node 110 includes user VMs 135A and 135B (collectively referred to herein as "user VMs 135"), a hypervisor 140, and a controller/service VM 145, and the third node 115 includes user VMs 150A and 150B (collectively referred to herein as "user VMs 150"), a hypervisor 155, and a controller/service VM 160. The controller/service VM 130, the controller/service VM 145, and the controller/service VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The virtual computing system 100 also includes a storage pool 170. The storage pool 170 may include network-attached storage 175 and direct-attached storage 180A, 180B, and 180C. The network-attached storage 175 is accessible via the network 165 and, in some embodiments, may include cloud storage 185, as well as local storage area network 190. In contrast to the network-attached storage 175, which is accessible via the network 165, the direct-attached storage 180A, 180B, and 180C includes storage components that are provided within each of the first node 105, the second node 110, and the third node 115, respectively, such that each of the first, second, and third nodes may access its respective direct-attached storage without having to access the network 165.

It is to be understood that only certain components of the virtual computing system 100 are shown in FIG. 1. Nevertheless, several other components that are needed or desired in the virtual computing system to perform the functions described herein are contemplated and considered within the scope of the present disclosure. Some additional features of the virtual computing system 100 are described in U.S. Pat. No. 8,601,473, the entirety of which is incorporated by reference herein.

Although three of the plurality of nodes (e.g., the first node 105, the second node 110, and the third node 115) are shown in the virtual computing system 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150).

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100. In some embodiments, the virtual computing system 100 may be part of a data center.

Each of the first node 105, the second node 110, and the third node 115 may also be configured to communicate and share resources with each other via the network 165. For example, in some embodiments, the first node 105, the second node 110, and the third node 115 may communicate and share resources with each other via the controller/service VM 130, the controller/service VM 145, and the controller/service VM 160, and/or the hypervisor 125, the hypervisor 140, and the hypervisor 155. One or more of the first node 105, the second node 110, and the third node 115 may be organized in a variety of network topologies.

Also, although not shown, one or more of the first node 105, the second node 110, and the third node 115 may include one or more processing units configured to execute instructions. The instructions may be carried out by a special purpose computer, logic circuits, or hardware circuits of the first node 105, the second node 110, and the third node 115. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 170, as well as with other elements of the first node 105, the second node 110, and the third node 115 to receive, send, and process information, and to control the operations of the underlying first, second, or third node. The processing units may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. Further, the processing units may include a single stand-alone processing unit, or a plurality of processing units that use the same or different processing technology.

With respect to the storage pool 170 and particularly with respect to the direct-attached storage 180A, 180B, and 180C, each of the direct-attached storage may include a variety of types of memory devices. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the network-attached storage 175 may include any of a variety of network accessible storage (e.g., the cloud storage 185, the local storage area network 190, etc.) that is suitable for use within the virtual computing system 100 and accessible via the network 165. The storage pool 170, including the network-attached storage 175 and the direct-attached storage 180A, 180B, and 180C, together form a distributed storage system configured to be accessed by each of the first node 105, the second node 110, and the third node 115 via the network 165, the controller/service VM 130, the controller/service VM 145, the controller/service VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine in the virtual computing system 100. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow.

The user VMs 120, the user VMs 135, and the user VMs 150 are controlled and managed by their respective instance of the controller/service VM 130, the controller/service VM 145, and the controller/service VM 160. The controller/service VM 130, the controller/service VM 145, and the controller/service VM 160 are configured to communicate with each other via the network 165 to form a distributed system 195. Each of the controller/service VM 130, the controller/service VM 145, and the controller/service VM 160 may also include a local management system (e.g., Prism Element from Nutanix, Inc.) configured to manage various tasks and operations within the virtual computing system 100. For example, in some embodiments, the local management system may perform various management related tasks on the user VMs 120, the user VMs 135, and the user VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the user VMs 120, the user VMs 135, and the user VMs 150, respectively, and for managing the interactions between those user VMs and the underlying hardware of the first node 105, the second node 110, and the third node 115. Each of the controller/service VM 130, the controller/service VM 145, the controller/service VM 160, the hypervisor 125, the hypervisor 140, and the hypervisor 155 may be configured as suitable for use within the virtual computing system 100.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the virtual computing system 100. For example, a particular user VM (e.g., the user VMs 120, the user VMs 135, or the user VMs 150) may direct an input/output request to the controller/service VM (e.g., the controller/service VM 130, the controller/service VM 145, or the controller/service VM 160, respectively) on the underlying node (e.g., the first node 105, the second node 110, or the third node 115, respectively). Upon receiving the input/output request, that controller/service VM may direct the input/output request to the controller/service VM (e.g., one of the controller/service VM 130, the controller/service VM 145, or the controller/service VM 160) of the leader node. In some cases, the controller/service VM that receives the input/output request may itself be on the leader node, in which case, the controller/service VM does not transfer the request, but rather handles the request itself.

The controller/service VM of the leader node may fulfil the input/output request (and/or request another component within the virtual computing system 100 to fulfil that request). Upon fulfilling the input/output request, the controller/service VM of the leader node may send a response back to the controller/service VM of the node from which the request was received, which in turn may pass the response to the user VM that initiated the request. In a similar manner, the leader node may also be configured to receive and handle requests (e.g., user requests) from outside of the virtual computing system 100. If the leader node fails, another leader node may be designated.

Furthermore, one or more of the first node 105, the second node 110, and the third node 115 may be combined together to form a network cluster (also referred to herein as simply "cluster.") Generally speaking, all of the nodes (e.g., the first node 105, the second node 110, and the third node 115) in the virtual computing system 100 may be divided into one or more clusters. One or more components of the storage pool 170 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120, the user VMs 135, and the user VMs 150 that are part of a cluster are configured to share resources with each other. In some embodiments, multiple clusters may share resources with one another.

Additionally, in some embodiments, although not shown, the virtual computing system 100 includes a central management system (e.g., Prism Central from Nutanix, Inc.) that is configured to manage and control the operation of the various clusters in the virtual computing system. In some embodiments, the central management system may be configured to communicate with the local management systems on each of the controller/service VM 130, the controller/service VM 145, the controller/service VM 160 for controlling the various clusters.

Again, it is to be understood again that only certain components and features of the virtual computing system 100 are shown and described herein. Nevertheless, other components and features that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Figure 2A:
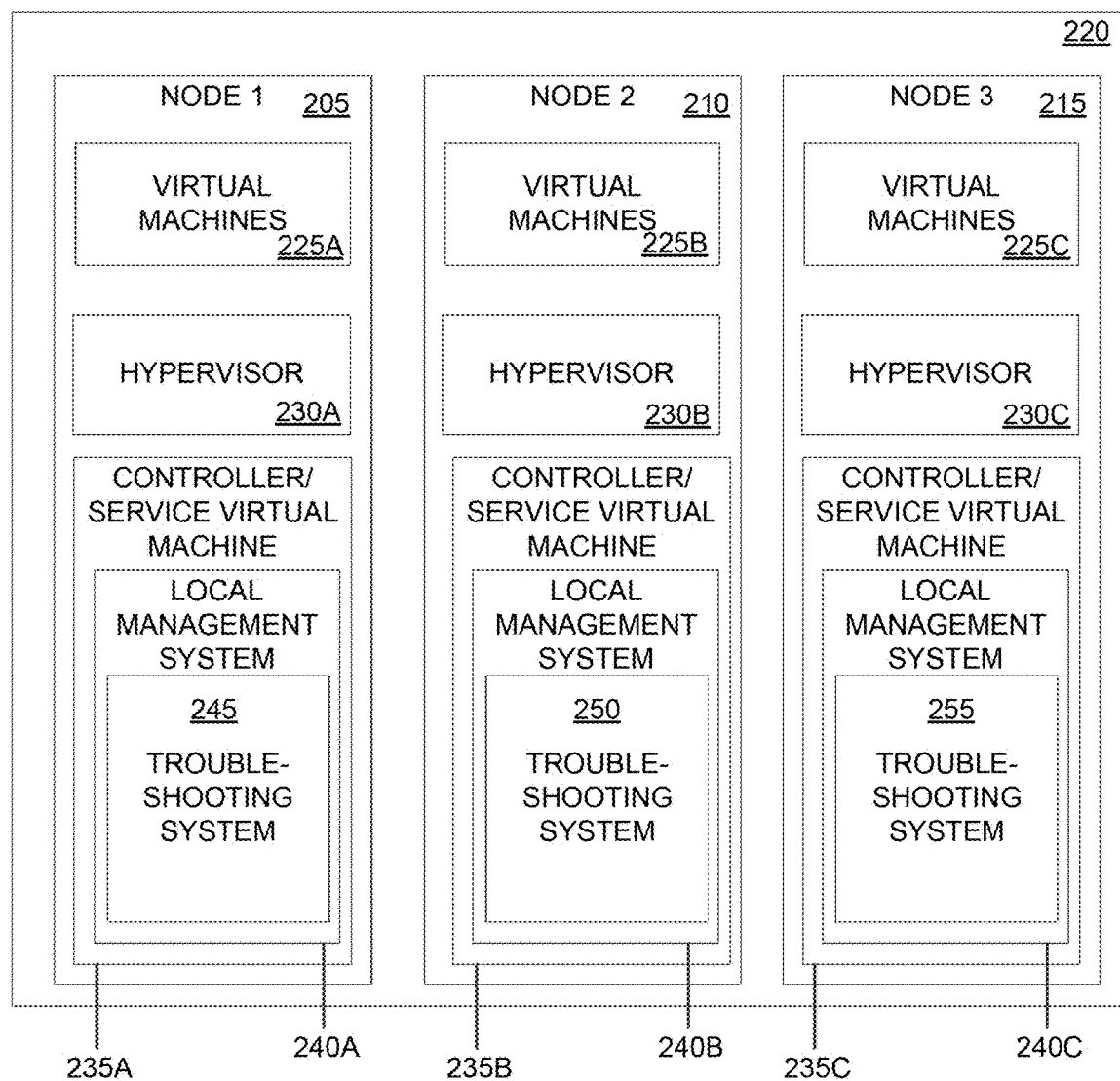
FIG. 2A is another example block diagram of the virtual computing system of FIG. 1 showing a troubleshooting system, in accordance with some embodiments of the present disclosure.
Figure 2B:
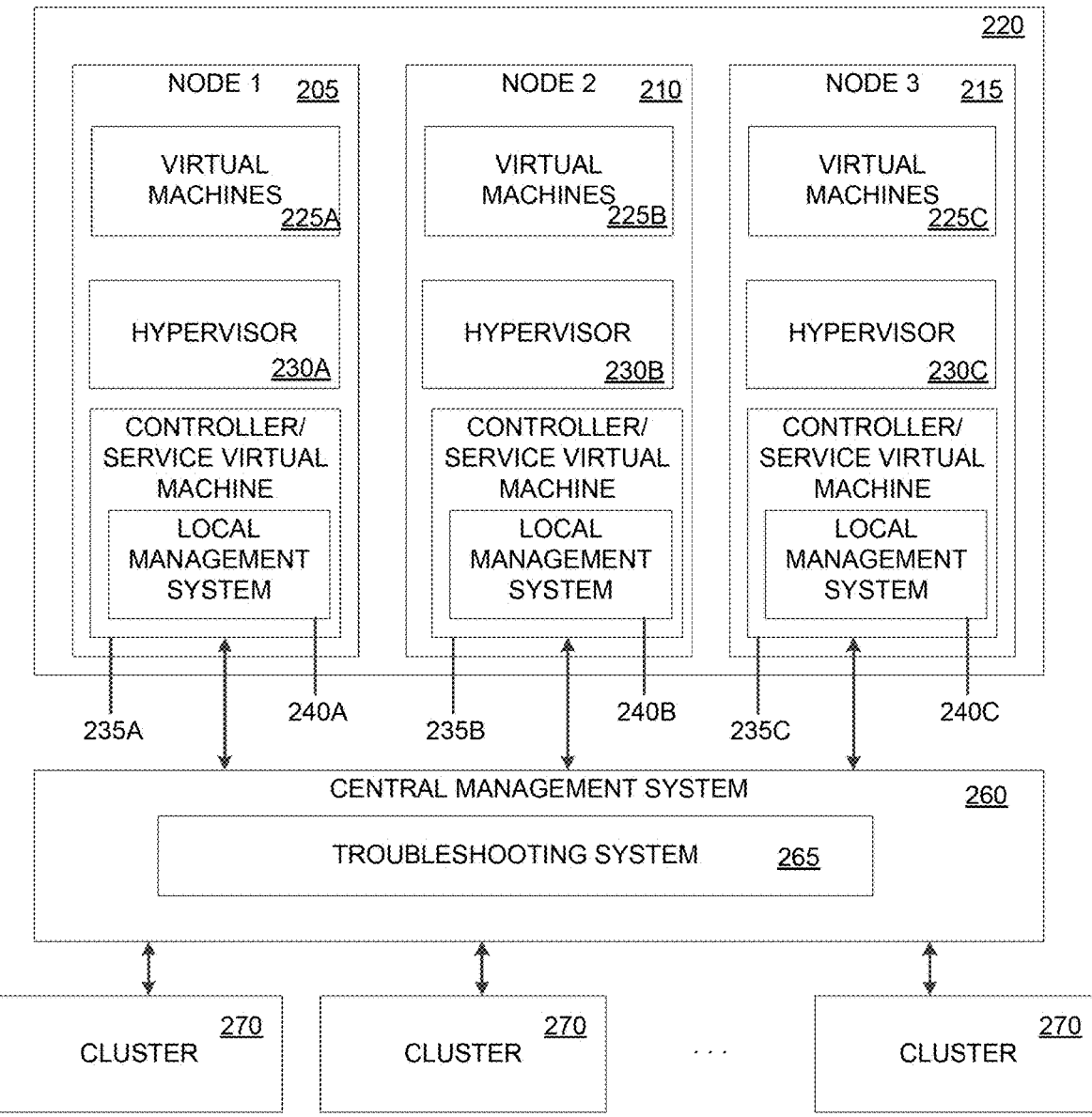
FIG. 2B is yet another example block diagram of the virtual computing system of FIG. 1 showing the troubleshooting system, in accordance with some embodiments of the present disclosure.

Turning to FIGS. 2A and 2B, another block diagram of a virtual computing system 200 is shown, in accordance with some embodiments of the present disclosure. The virtual computing system 200 is analogous to, albeit a simplified version, of the virtual computing system 100. Thus, although only some of the components have been shown in the virtual computing system 200, the virtual computing system is intended to include other components and features, as discussed above with respect to the virtual computing system 100. Referring to FIGS. 2A and 2B together, the virtual computing system 200 includes a first node 205, a second node 210, and a third node 215, all of which form part of a cluster 220. Although only three nodes (e.g., the first node 205, the second node 210, and the third node 215) have been shown in the cluster 220, the number of nodes may vary to be greater than or fewer than three.

The first node 205 includes virtual machines 225A, the second node 210 includes virtual machines 225B, and the third node 215 includes virtual machines 225C. Additionally, the first node 205 includes a hypervisor 230A and a controller/service virtual machine 235A. Similarly, the second node 210 includes a hypervisor 230B, and a controller/service virtual machine 235B, while the third node 215 includes a hypervisor 230C, and a controller/service virtual machine 235C. Further, each of the controller/service virtual machine 235A, controller/service virtual machine 235B, and controller/service virtual machine 235C, respectively, include a local management system 240A, a local management system 240B, and a local management system 240C. The local management system 240A, the local management system 240B, and the local management system 240C, in some embodiments, may be the Prism Element component from Nutanix, Inc., and may be configured to perform a variety of management tasks on the underlying node (e.g., the first node 205, the second node 210, and the third node 215, respectively).

Referring now specifically to FIG. 2A, the local management system 240A, the local management system 240B, and the local management system 240C, respectively, include a troubleshooting system 245, a troubleshooting system 250, and a troubleshooting system 255. The troubleshooting system 245, the troubleshooting system 250, and the troubleshooting system 255 are each configured to facilitate identification of possible causes of problems that may be occurring within the virtual computing system 200 and resolution of those problems. Specifically, the troubleshooting system 245, the troubleshooting system 250, and the troubleshooting system 255 are each configured to identify most probable causes of problems from a list of possible causes of those problems based upon information received from a user, and present those most probable causes to the user, as explained in greater detail below.

In some embodiments and as shown in FIG. 2B, instead of being part of the local management system 240A, the local management system 240B, and the local management system 240C, the troubleshooting system may be part of a central management system (also referred to herein as "overall management system") 260. Thus, the central management system 260 may include a troubleshooting system 265. The central management system 260, in some embodiments, is the Prism Central component from Nutanix, Inc. that is configured to manage all of the clusters (e.g., including the cluster 220 and clusters 270) within the virtual computing system 200.

Further, in some embodiments, the central management system 260 may communicate with the local management system 240A, the local management system 240B, and the local management system 240C of the cluster 220 for managing the various components of that cluster. In other embodiments, the central management system 260 may communicate with the local management system (e.g., the local management system 240A, the local management system 240B, or the local management system 240C) on the leader node or a local management system designated to communicate with the central management system. Similarly, the central management system 260 may communicate with the local management systems of the nodes of the clusters 270 in the virtual computing system 200 for managing those clusters.

The troubleshooting system 265 is analogous to each of the troubleshooting system 245, the troubleshooting system 250, and the troubleshooting system 255 of FIG. 2A discussed above. Further, although each of troubleshooting system 245, the troubleshooting system 250, and the troubleshooting system 255 of FIG. 2A is shown as entirely being a part of the local management system 240A, the local management system 240B, and the local management system 240C, respectively, and the troubleshooting system 265 of FIG. 2B is shown as entirely being a part of the central management system 260, in some embodiments, portions of those troubleshooting systems may be part of the local management system and other portions may be part of the central management system. In other embodiments, an instance of the troubleshooting system (e.g., the troubleshooting system 245, the troubleshooting system 250, and the troubleshooting system 255, the troubleshooting system 265) may be provided in both, the local management system (e.g., the local management system 240A, the local management system 240B, and the local management system 240C), as well as the central management system (e.g., the central management system 260).

Although the troubleshooting system 245, the troubleshooting system 250, the troubleshooting system 255, and the troubleshooting system 265 have been discussed as being part of either the local management system (e.g., the local management system 240A, the local management system 240B, and the local management system 240C) or the central management system 260, in some embodiments, those troubleshooting systems may be part of other components within the virtual computing system 200. In some embodiments, the troubleshooting system 245, the troubleshooting system 250, the troubleshooting system 255, and the troubleshooting system 265 may be part of a computing system that is outside of the virtual computing system 200 but associated therewith in operational association to perform the functions described herein. Thus, the troubleshooting system 245, the troubleshooting system 250, the troubleshooting system 255, and the troubleshooting system 265 may be configured in a variety of ways.

Further, in some embodiments, the troubleshooting system 245, the troubleshooting system 250, the troubleshooting system 255, and the troubleshooting system 265 may be configured to be accessed via a user interface (e.g., troubleshooting interface in FIG. 3 below) on one or more of the user VMs (e.g., the users VMs 255A, the user VMs 255B, and the user VMs 255C) and/or one of the controller/service VMs (e.g., the controller/service virtual machine 235A, controller/service virtual machine 235B, and controller/service virtual machine 235C) using an application programming interface ("API"). In such cases, users may access the troubleshooting system 245, the troubleshooting system 250, the troubleshooting system 255, and the troubleshooting system 265 via designated devices such as laptops, desktops, tablets, other handheld or portable devices, and/or other types of computing devices that are configured to access the API. The API, thus, provides a set of routines, protocols, and tools to allow users to access the troubleshooting system 245, the troubleshooting system 250, the troubleshooting system 255, and the troubleshooting system 265.

In some embodiments, the API may be a representational state transfer ("REST") type of API. In other embodiments, the API may be any other type of web or other type of API (e.g., ASP.NET) built using any of a variety of technologies, such as Java, .Net, etc., that is capable of accessing the troubleshooting system 245, the troubleshooting system 250, the troubleshooting system 255, and the troubleshooting system 265 and facilitating communication between the users and the troubleshooting system. In some embodiments, the API may be configured to facilitate communication between the users and the troubleshooting system 245, the troubleshooting system 250, the troubleshooting system 255, and the troubleshooting system 265 via the user interface using a hypertext transfer protocol ("HTTP") or hypertext transfer protocol secure ("HTTPS") type request. The API may receive an HTTP/HTTPS request and send an HTTP/HTTPS response back. In other embodiments, the API may be configured to facilitate communication between the users and the troubleshooting system 245, the troubleshooting system 250, the troubleshooting system 255, and the troubleshooting system 265 using other or additional types of communication protocols. In some embodiments and when configured for use via an API, the users may access the user interface of the troubleshooting system 245, the troubleshooting system 250, the troubleshooting system 255, and the troubleshooting system 265 via a web browser and upon entering a uniform resource locator ("URL") for the API.

In other embodiments, the troubleshooting system 245, the troubleshooting system 250, the troubleshooting system 255, and the troubleshooting system 265 may be configured for user access in ways other than or in addition to access via an API.

Again, notwithstanding the components of the virtual computing system 200 shown and described herein, in other embodiments, the virtual computing system 200 is intended to include other components and features, as described above with respect to the virtual computing system 100.

Figure 3:
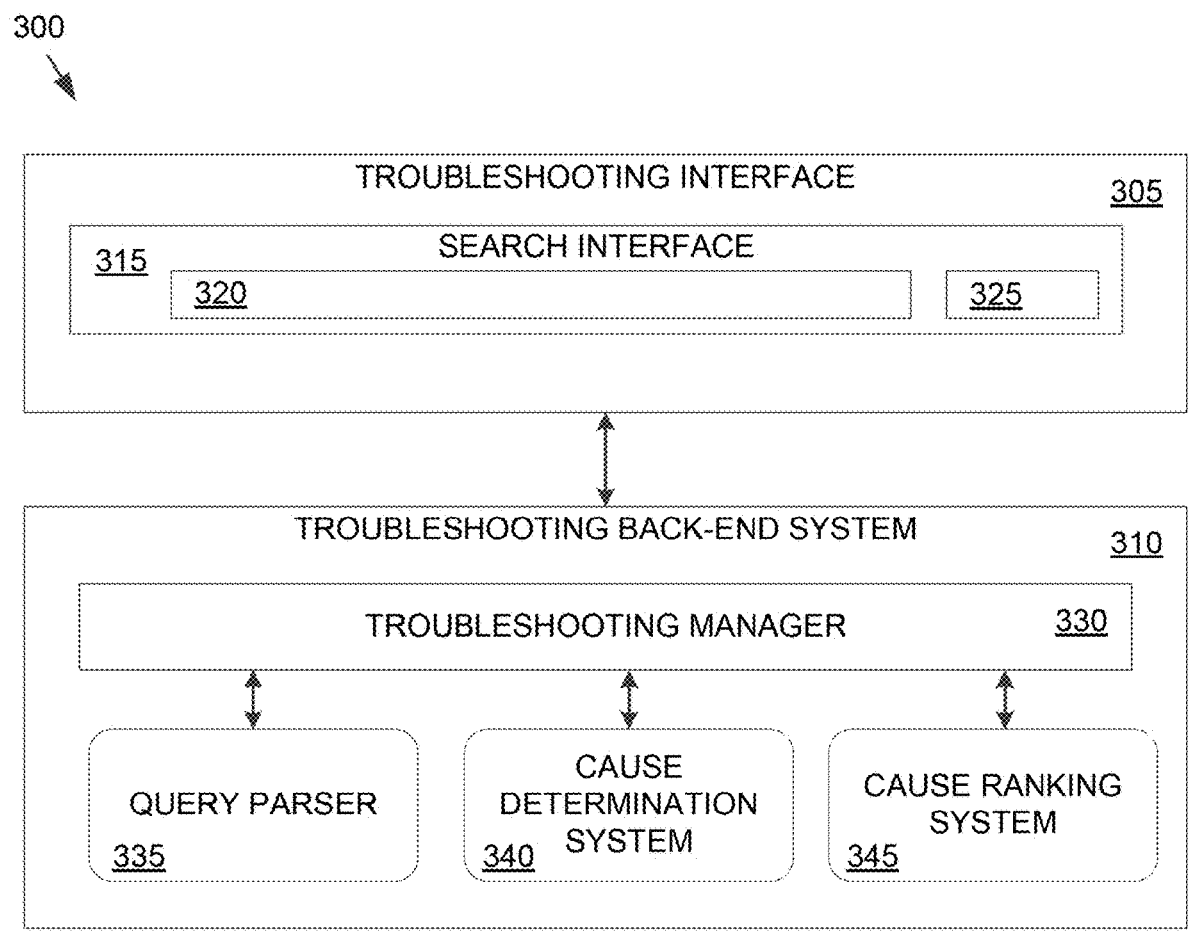
FIG. 3 is an example block diagram showing the troubleshooting system of FIGS. 2A and 2B in greater detail, in accordance with some embodiments of the present disclosure.

Turning now to FIG. 3, a block diagram of an example troubleshooting system 300 is shown, in accordance with some embodiments of the present disclosure. The troubleshooting system 300 is configured to automatically identify most probable causes of problems within the virtual computing system (e.g., the virtual computing system 200). "Problems" as used herein means abnormal behavior or operation of a hardware, software, and/or firmware component within the virtual computing system (e.g., the virtual computing system 100). "Problems" may be identified or represented by "alerts" issued by a component, "metrics" such as latency, CPU usage, etc. that are outside normal operating range, and any other mechanism that represents an anomaly or abnormal operating behavior of a component.

The troubleshooting system 300 is configured to trigger the troubleshooting process in response to an input (e.g., search query) received from a user. The troubleshooting system 300 includes a front-end system, namely, a troubleshooting interface 305 that is viewable by the user and a back-end system, namely, a troubleshooting back-end system 310 that is not visible to the user. The troubleshooting interface 305 may be configured for access via an API or another mechanism. The troubleshooting interface 305 is a user interface that facilitates human-computer interaction between the user and the troubleshooting back-end system 310. Thus, the troubleshooting interface 305 is configured to receive user inputs from the user and transmit those user inputs to the troubleshooting back-end system 310. The troubleshooting interface 305 is also configured to receive outputs from the troubleshooting back-end system 310 and present those outputs to the user via the troubleshooting interface.

In some embodiments, the troubleshooting interface 305 is configured as a graphical user interface ("GUI"). The GUI may present a variety of graphical icons, visual indicators, menus, visual widgets, and other indicia to facilitate user interaction. In other embodiments, the troubleshooting interface 305 may be configured as other types of user interfaces, including for example, text-based user interfaces, man-machine interfaces, etc. In some embodiments, a portion of the troubleshooting interface 305 may be configured as one type of user interface (e.g., GUI), while another portion of the troubleshooting interface may be configured as another type of user interface (e.g., text-based). Thus, the troubleshooting interface 305 may be configured in a variety of ways.

Further, the troubleshooting interface 305 may be configured to receive the user inputs in a variety of ways. For example, the troubleshooting interface 305 may be configured to receive the user inputs using input technologies including, but not limited to, a keyboard, a stylus and/or touch screen, a mouse, a track ball, a keypad, a microphone, voice recognition, motion recognition, remote controllers, input ports, one or more buttons, dials, joysticks, etc. that allow an external source, such as the user, to enter information into the troubleshooting interface. The troubleshooting interface 305 may also be configured to present outputs from the troubleshooting back-end system 310 to the user in a variety of ways. For example, the troubleshooting interface 305 may be configured to present information to external systems such as storage devices, printers, speakers, etc.

Therefore, although not shown, the troubleshooting interface 305 is associated with a variety of hardware, software, firmware components, or combinations thereof. Generally speaking, the troubleshooting interface 305 may be associated with any type of hardware, software, and/or firmware component that enables the troubleshooting interface to perform the functions described herein.

As shown in FIG. 3, the troubleshooting interface 305 includes a search interface 315. The search interface 315 includes a search box 320 to receive search queries from the user and a search button 325 to send the search queries to the troubleshooting back-end system 310. It is to be understood that although only the search interface 315 is shown on the troubleshooting interface 305, in other embodiments, additional features may be provided on the troubleshooting interface. The user may start a troubleshooting process by entering a search query (also referred to herein as a "troubleshooting query") in the search box 320 and interacting with (e.g., clicking on) the search button 325. Upon interacting with the search button 325, the search query is transmitted to the troubleshooting back-end system 310 via a network (not shown). The troubleshooting back-end system 310 receives the search query, parses the search query to identify a problem from the search query, classifies the problem into one of designated troubleshooting categories, identifies possible causes of the problem based upon the search query and the designated troubleshooting category, ranks the possible causes to identify the most probable causes of the problem, and presents the most probable causes to the user via the troubleshooting interface 305.

Although not shown, the troubleshooting back-end system 310 may be configured as hardware, software, firmware, or a combination thereof. Specifically, the troubleshooting back-end system 310 may include one or more processing units configured to execute instructions and one or more memory units to store those instructions and other conversion related data. In some embodiments, the troubleshooting back-end system 310 may be connected to a storage pool (e.g., the storage pool 170) to receive, send, and process information, and to control the interactions with the users. The instructions may be carried out by a special purpose computer, logic circuits, or hardware circuits of the troubleshooting back-end system 310. The processing units may, thus, be implemented in hardware, firmware, software, or any combination thereof. The processing units execute an instruction, meaning that they perform the operations called for by that instruction. The processing units may retrieve a set of instructions from a memory (e.g., the storage pool 170 or any other memory in which such instructions may be stored). For example, in some embodiments, the processing units may retrieve the instructions from a permanent memory device like a read only memory (ROM) device and copy the instructions in an executable form to a temporary memory device that is generally some form of random access memory (RAM). The ROM and RAM may both be part of the storage pool (e.g., the storage pool 170), or in some embodiments, may be separately provisioned from the storage pool. Further, the processing units may include a single stand-alone processing unit, or a plurality of processing units that use the same or different processing technology. The instructions may be written using one or more programming language, scripting language, assembly language, etc.

Further, as shown in FIG. 3, the troubleshooting back-end system 310 includes a troubleshooting manager 330, a query parser 335, a cause determination system 340, and a cause ranking system 345. Although only the troubleshooting manager 330, the query parser 335, the cause determination system 340, and the cause ranking system 345 are shown as being part of the troubleshooting back-end system 310, in other embodiments, additional elements that may be needed or considered desirable to perform the functions described herein may be provided. Additionally, although the troubleshooting manager 330, the query parser 335, the cause determination system 340, and the cause ranking system 345 have been shown as separate from one another, in some embodiments, one or more of the troubleshooting manager, the query parser, the cause determination system, and the cause ranking system may be combined together. Moreover, although not shown, one or more of the troubleshooting manager 330, the query parser 335, the cause determination system 340, and the cause ranking system 345 may communicate with or otherwise be associated with other elements (e.g., various databases in the storage pool 170, various services that publish data, etc.) within the virtual computing system (e.g., the virtual computing system 200) to perform their respective functions.

The troubleshooting manager 330 is configured to receive the search queries from the troubleshooting interface 305 and communicate with the query parser 335, the cause determination system 340, and the cause ranking system 345 to identify the most probable causes of problems identified from the search query. Specifically, upon receiving the search query, the troubleshooting manager 330 transmits the search query to the query parser 335. The query parser 335 parses the search query to identify a problem from the search query and categorizes the identified problem into one or more troubleshooting categories. The query parser 335 may be associated with or may be part of a search system within the virtual computing system (e.g., the virtual computing system 200).

The search query that is entered by the user in the search box 320 may take a variety of forms. For example, in some embodiments, the search query may include keywords that are already recognized by the query parser 335. In other embodiments, the search query may include words, phrases, expressions (e.g., mathematical operators, IP addresses, etc.), or other "human-friendly" terms that are not specifically recognized by the query parser 335, but may be converted into recognized keywords by the query parser. Further, the search query may be specific or general. For example, in some embodiments, the search query may include the identity of a particular component that the user is troubleshooting. In some embodiments, in addition to or instead of the identity of the component, the search query may identify the problem (e.g., latency, CPU usage, etc.) that the user is troubleshooting. In yet other embodiments, the user may provide as a search query a system generated alert conveying a problem or issue within the virtual computing system (e.g., the virtual computing system 200).

Examples of search queries that the user may enter in the search interface 315 may include "VM1 slow," "VM slow," "VM1 latency," "VM1 CPU utilization >75%," "VM alert," "troubleshoot VM1," "high latency," and the like. Each of the terms in each of the search queries above may either be a recognized keyword or may be converted by the query parser 335 into a recognized keyword. It is to be understood that the search queries provided above are simply examples and are not intended to be construed as limiting in any way. The actual format and content of each of the search queries above may vary. Further, although the search queries provided above are mostly all directed to virtual machines (VMs), the search queries need not be limited to virtual machines only. Rather, the search query may be directed to any component of the virtual computing system (e.g., the virtual computing system 200) that the user desires to troubleshoot using the troubleshooting system 300. Thus, the configuration of the search queries may vary and the search queries may be as specific or as vague as the user desires. The query parser 335 is configured to analyze and interpret those search queries.

Specifically, upon receiving the search query, the query parser 335 breaks or tokenizes the search query and particularly, the characters of the search query, into one or more tokens. For each token, the query parser identifies keywords, expressions, and/or IP addresses that are recognized by the search system and/or the troubleshooting system 300. The query parser 335 may communicate with various databases (e.g., a keyword database, an expression database, an IP address database, etc., which may be stored within the storage pool 170 or otherwise be accessible to the query parser) to parse the search query. The query parser may also convert any "human-friendly" terms in the user input into recognized keywords. The query parser may also rank the identified keywords, identify relationships between the keywords, match keywords and assign scores, etc. to parse the search query.

Upon parsing, the query parser 335 identifies at least one of a component type (e.g., VMs, hosts, clusters, etc.), identity (e.g., name) of the component type, and one or more attributes (e.g., alerts, metrics, etc.) associated with the identified component type. The component type and the identity of the component type may provide an indication of the component that is experiencing the problem and needs to be troubleshot, and the attributes may provide an indication of the problem that the component is experiencing. Simply as an example and without intending to be limiting in any way, the query parser 335 may parse a search query "VM1 slow" to determine that the type of component involved is a virtual machine, the identity (e.g., the name) of the virtual machine is VM1, and the attribute to troubleshoot (e.g., the problem being faced) is latency (e.g., "slow" may be a "human-friendly" term for latency).

In some embodiments, if the component type or identity of the component type is not apparent to the query parser 335, the query parser may associate a default component type with the search query. In other embodiments, the search query may itself not include the component type and/or the identity of the component type, but may include information that may enable the query parser 335 to determine the component type and/or the identity of the component type. For example, if the search query includes a particular alert that is (or was) being raised in the virtual computing system (e.g., the virtual computing system 200), the query parser 335 may access an alerts database to gather additional information about the alert and identify the component type and/or the identity of the component type to troubleshoot from the alerts database.

Similarly, if the search query does not identify an attribute to troubleshoot, the query parser 335 may either assign a default attribute to the search query or assign no attribute to the search query in which case, the troubleshooting system 300 looks for all types of problems facing the component identified from the search query. Thus, based upon the information included in the search query, the query parser 335 parses the search query to possibly identify the problem to troubleshoot and the component experiencing that problem. Additional details pertaining to parsing search queries may be found in U.S. application Ser. No. 15/143,060, filed on Apr. 29, 2016, the entirety of which is incorporated by reference herein.

Furthermore, as part of the parsing, in some embodiments, the query parser 335 may also identify whether the search query is in fact related to "troubleshooting." In some embodiments, the query parser 335 may be configured to assume that each query received via the troubleshooting interface 305 is a troubleshooting query for troubleshooting a possible problem. In other embodiments, the query parser 335 may be configured to specifically identify troubleshooting queries. In such cases, in some embodiments, the query parser 335 may identify a troubleshooting query by virtue of the keyword "troubleshoot" or "troubleshooting," or the like in the search query. In other embodiments, the query parser 335 may be configured to associate certain keywords with troubleshooting (referred to herein as "troubleshooting keywords"). The troubleshooting keywords may be indicative of a problem that the user may be trying to troubleshoot. For example, keywords associated with alerts, metrics (e.g., latency, CPU usage, etc.), and other anomalies may be designated as troubleshooting keywords. In other embodiments, additional or other keywords may be designated as troubleshooting keywords. Upon recognizing a troubleshooting keyword in the search query, the query parser 335 may designate the search query as a troubleshooting query.

In some embodiments in which the query parser 335 is configured to specifically identify troubleshooting queries and in which the query parser determines that the search query is not a troubleshooting query, the query parser may simply return a list of search results that may be relevant to the search query. In other such embodiments, the query parser 335 may be configured to present specific questions on the troubleshooting interface 305 to solicit additional information from the user for determining whether the search query is in fact a troubleshooting query. In yet other embodiments, the query parser 335 may be configured to take other or additional designated actions upon determining that a search query is not a troubleshooting query.

On the other hand, if the query parser 335 is configured to automatically consider each search query as a troubleshooting query by default or identifies a particular search query as a troubleshooting query, the query parser may categorize the troubleshooting keywords identified in the troubleshooting query into one or more pre-determined troubleshooting categories. For example, in some embodiments, each troubleshooting keyword may be associated with one or more types of troubleshooting categories. For example, in some embodiments, a mapping of each troubleshooting keyword to the associated troubleshooting category may be maintained and stored within a database (e.g., the storage pool 170) for access by the query parser 335. In other embodiments, other mechanisms to determine the association of the troubleshooting keywords to their respective troubleshooting category may be used.

In some embodiments, the troubleshooting categories may include "slowness," "availability," and "capacity." In other embodiments, the troubleshooting categories may additionally or alternatively include "optimization" that is configured for optimizing a particular element (e.g., a hardware, software, or firmware element, and/or a parameter associated therewith), "security configuration" that is related to identifying and fixing various security related issues of the various elements in the virtual computing system (e.g., the virtual computing system 100), "risk" that identifies issues that may increase risk of malfunction or other abnormal behavior within the virtual computing system (e.g., the virtual computing system 100), and "configuration" for identifying configuration related issues within the virtual computing system. In yet other embodiments, other or additional troubleshooting categories may be designated. The present disclosure is explained with respect to the "slowness," "availability," and "capacity" troubleshooting categories. However, it is to be understood that the present disclosure is similarly applicable to any other troubleshooting category that may be used.

"Slowness" troubleshooting category may relate to components (e.g., virtual machines) in the virtual computing system (e.g., the virtual computing system 200) that are running slow or experiencing reduced performance. "Availability" troubleshooting category may relate to components not being available (e.g., being offline) to perform their intended operations, while "capacity" troubleshooting category may relate to components not having sufficient capacity (e.g., sufficient storage space) to perform requested operations. Thus, based upon the troubleshooting keyword, the query parser 335 may determine whether the troubleshooting keyword is indicative of a "slowness" problem, an "availability" problem, and/or a "capacity" problem.

In some embodiments, the troubleshooting categories may include levels. For example, the troubleshooting categories may first be classified as "performance" related or "non-performance" related, and then the "performance" related troubleshooting categories may be sub-divided into "slowness," "availability," "capacity," etc. Similarly, the "non-performance" troubleshooting category may be further sub-divided into multiple sub-categories. It is to be understood that the "non-performance" related categories may itself include multiple troubleshooting categories, which have been combined together here into one general category simply for ease of instruction. Thus, the troubleshooting categories may be configured in a variety of ways as desired. The troubleshooting categories may be used, as discussed below, to identify possible causes of a problem.

The query parser 335 transmits the parsed information back to the troubleshooting manager 330 and/or to the cause determination system 340. Specifically, the query parser 335 provides the component type and/or the identity of the component type, the problem facing the component (e.g., the troubleshooting keywords), and/or the troubleshooting category or categories to the troubleshooting manager 330 and/or the cause determination system 340. The cause determination system 340, thus, receives the information either directly from the query parser 335 and/or from the troubleshooting manager 330. Based on the troubleshooting category(ies) that the cause determination system 340 receives, the cause determination system identifies one or more possible causes of the problem that the user may be trying to solve.

For example, if the search query entered into the search interface 315 is "VM1 slow," as indicated above, the query parser 335 may, in some embodiments, parse this search query to identify a troubleshooting keyword, "latency" and troubleshooting category "slowness." The cause determination system 340 then determines possible causes from the "slowness" troubleshooting category that may be causing the latency related problems on VM1.

In some embodiments, the cause determination system 340 uses a cause determination graph to identify the possible causes. Each troubleshooting category may be associated with one branch of an overall cause determination graph or a separate cause determination graph. The cause determination graph may list various possible causes associated with that category. The various causes that are listed within the cause determination graph may change based upon the current state of the system (e.g., the current state of the virtual computing system 200). Thus, the cause determination graph is a dynamic graph that reflects the current state of the system (e.g., the current state of the virtual computing system 200). By traversing the cause determination graph, the cause determination system 340 may identify one or more possible causes of the problem. For example, for the search query "VM1 slow" mentioned above, the cause determination system 340 may traverse the cause determination graph pertaining to the "slowness" troubleshooting category and identify one or possible causes of slowness that may be impacting the virtual machine, VM1. Examples of the cause determination graph are shown in and discussed with respect to FIGS. 4-5C below.

In addition to identifying the possible causes, the cause determination system 340 may also compile the possible causes in a list, tabular, or other designated manner, and provide the compiled work product to the troubleshooting manager 330 and/or the cause ranking system 345. Thus, the cause ranking system 345 receives the compilation of all possible causes either directly from the cause determination system 340 and/or indirectly from the troubleshooting manager 330. The cause ranking system 345 ranks all of the possible causes based upon pre-determined criteria to identify the most probable causes of the problem. The criteria that the cause ranking system 345 uses to rank the possible causes may vary from one embodiment to another.

For example, in some embodiments, the cause ranking system 345 may use a weighting system to rank the possible causes. In other embodiments, the cause ranking system 345 may use an alert score to rank the possible causes, while in yet other embodiments, the cause ranking system may use a chronological order. In other embodiments, the cause ranking system 345 may be configured to apply other or additional ranking criteria. In some embodiments, the cause ranking system 345 may be configured to apply a single-ranking criteria, while in other embodiments, the cause ranking system may be configured to apply multiple ranking criteria. When using multiple ranking criteria, the cause ranking system 345 may be configured to rank the possible causes based on a first ranking criteria to obtain a first ranked list, then rank subsets of the first ranked list according to a second ranking criteria, and so on. Thus, the ranking criteria applied to the cause ranking system 345 and the order of applying the ranking criteria may vary from one embodiment to another.

When a weighting system is used to rank the possible causes, in some embodiments, the cause ranking system 345 may assign pre-determined weights to each type of possible cause based upon the perceived importance of that type of possible cause. The weight that is to be assigned to a particular type of possible cause may be pre-determined and accessible to the cause ranking system 345. For example, in some embodiments, critical alerts may be assigned a higher weight than non-critical alerts, which in turn may be assigned higher weights than other types of possible causes such as anomalies and metrics. "Anomalies" as used herein means abnormal behavior or deviation from normal operation. The deviation may or may not be enough to raise an alert. For example, in some embodiments, deviation from the normal behavior but that is within a pre-determined threshold may be considered an anomaly but does not raise an alert, and deviation that exceeds the pre-determined threshold may raise an alert. Thus, based upon the type of possible causes, the cause ranking system 345 may assign weights to each possible cause and then rank the possible causes such that the cause with the highest weight is ranked highest.

When an alert score is used, an alert score may be assigned to each possible cause. In some embodiments, the alert scores may be based on the criticality of the alert (e.g., critical alert versus warning alert) such that critical alerts are assigned higher alert scores than non-critical (e.g., warning) alerts. In other embodiments, a pre-determined alert score may be assigned to each type of possible cause. In some embodiments, the alert score may be based on a criteria comprising an indication of time such that a particular possible cause is assigned a higher alert score if that possible cause occurred in more recent time. In some embodiments, an alert score may be assigned to each component (e.g., each node, each virtual machine, etc.) based upon the number of problems occurring on that component. For example, if a particular node is raising alerts, reporting other anomalies, and certain metric values on that node are abnormal, then there are three possible causes of problems on that node. The cause ranking system 345 may assign individual scores or weights to each of the three possible problems and then compute an overall alert score for that node based upon the individual scores or weights. The cause ranking system 345 may compute similar overall alert scores for the other components that are indicated in the possible causes and then rank the components based upon the alert scores.

In some other embodiments, instead of computing the overall alert score per component, the overall alert score may be computed based upon the total number of components that are generating a particular type of problem. For example, if a first component has a possible cause of one type, and a second component has a possible cause of the same type, the alert scores of both component may be combined (e.g., summed) together into the overall alert score. Thus, for example, if four component are raising the same alert, then the overall alert score for that alert is higher and the cause ranking system 345 ranks that alert higher. In other embodiments, if a component has a possible cause of one type, and a related component has a possible cause of the same type, only the alert score corresponding to the component may be included in the summation. In yet another embodiment, the alert score corresponding to one of the possible causes is equal to the individual alert score of the most recent alert or anomaly for the possible cause. Thus, the alert score may be configured in a variety of ways. Other criteria may be used for ranking the possible causes.

Thus, the ranking criteria is chosen such that by ranking the possible causes, the cause ranking system 345 ranks the most probable causes of the problem higher than the lower probable causes of the problem. The cause ranking system 345 returns the ranked possible causes to the troubleshooting manager 330. The troubleshooting manager 330 displays the ranked possible causes on the troubleshooting interface 305. In some embodiments, the troubleshooting manager 330 may display all of the ranked possible causes on the troubleshooting interface 305. In other embodiments, the troubleshooting manager 330 may present a subset (e.g., pre-determined number) of highest ranked possible causes to the displayed at a time on the troubleshooting interface 305. The troubleshooting manager 330 may also associate additional information with each of the ranked possible causes such that by interacting with (e.g., clicking on) each possible cause, the user may view additional information pertaining to that possible cause. By presenting most likely causes of the problem first, the troubleshooting system 300 systematically guides the user to review each (or a subset of) possible cause(s) starting with the most likely cause until the user has identified the root cause of the problem.

The troubleshooting system 300 thus, facilitates an effective and quicker resolution of a problem. In contrast to conventional mechanisms in which a static list of causes in no particular order is presented for the user to go through, the troubleshooting system 300 provides a dynamic list of possible causes that are based upon the current state of the system (e.g., the virtual computing system 200) and that are also ranked such that the most probable cause of the problem is ranked higher. Therefore, the troubleshooting system 300 provides a guided workflow to the user to resolve a problem starting with the most probable cause of that problem and gradually moving down the chain to lesser and lesser probable causes.

Figure 4:
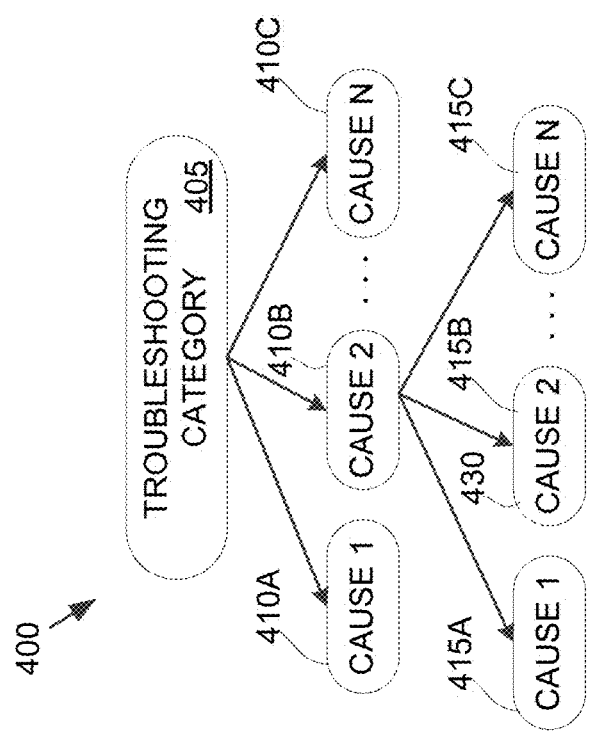
FIG. 4 is an example of a cause determination graph used within the troubleshooting system of FIG. 3, in accordance with some embodiments of the present disclosure.

Turning now to FIG. 4 and referring to FIG. 4 in conjunction with FIG. 3, an example cause determination graph 400 is shown, in accordance with some embodiments of the present disclosure. The cause determination graph 400 is implemented by or associated with the cause determination system 340 of FIG. 3. The cause determination graph 400 is stored within a database (e.g., the storage pool 170) that is accessible to the cause determination system 340. The cause determination graph 400 is a dynamic graph the elements of which may change based upon the current state of the system (e.g., the virtual computing system 100). The cause determination graph 400 is used to identify one or more possible causes of a problem based upon the troubleshooting category identified by the query parser 335.

In some embodiments, the cause determination graph 400 is organized in a tree-like structure that includes multiple levels, with each higher level having one or more nodes that are linked to nodes in a lower level in a parent-child relationship. Nodes of a higher level (e.g., parent node) in the cause determination graph 400 are connected to the nodes in a lower level (e.g., child nodes) via links. Thus, each parent node may have one or more child nodes, and each of the child nodes may further have one or more child nodes, and so on. Each child node further defines and limits the information presented in the associated parent node.

The highest level of the cause determination graph 400 is the troubleshooting category, as represented by node 405. The node 405 may include one or more child nodes, such as nodes 410A, 410B, 410C (collectively referred to herein as "nodes 410"). Each of the nodes 410 is connected to the node 405 in a parent-child relationship. Further, each of the nodes 410 further define or limit the troubleshooting category identified by the node 405. Each of the nodes 410 may in turn have one or more child nodes, such as nodes 415A, 415B, 415C (collectively referred to herein as "nodes 415"). Each of the nodes 415 may in turn have one or more child nodes (not shown), and so on, until a last or lowest level of the cause determination graph 400 is reached. Thus, between the highest level (e.g., the node 405) and the lowest level, the cause determination graph may have one or more intermediate levels. In some embodiments, for at least one node, there may be no intermediate levels between the highest level and the lowest level.

It is to be understood that the cause determination graph 400 is only an example and that variations in the cause determination graph are contemplated and considered within the scope of the present disclosure. For example, although only three levels (the node 405 in the highest level, the nodes 410 in the intermediate level, and the nodes 415 in the lowest level) are shown in the cause determination graph 400, the number of levels may vary in other embodiments. Similarly, although only one of the nodes 410 is shown to have child nodes (e.g., the nodes 415), it is to be understood that one or more of the other nodes 410 may also have one or more child nodes. Likewise, although none of the nodes 415 have been shown as having child nodes, one or more of the nodes 415 may have child nodes, and which in turn may have child nodes, and so on.

The cause determination graph 400 may be "traversed" in "branches." For example, to traverse a branch, the cause determination system 340 starts from the highest level (e.g., the node 405) of the cause determination graph 400, then goes down to a child node of the highest level (e.g., to one of the nodes 410 that is directly connected to the node 405 in a parent-child relationship), then to a child node of that child node (e.g., to one of the nodes 415 directly connected in a parent-child relationship with the nodes 410), and so on until the lowest level is reached. Thus, nodes 405, 410B, and 415C in the cause determination graph 400 may constitute one branch and the nodes 405, 410B, and 415B may constitute another branch. Thus, some nodes may be part of multiple branches. The number of branches in the cause determination graph 400, including the number of levels in each branch may vary from one embodiment to another.

Further, the cause determination graph 400 may be structured such that the nodes in the intermediate levels of each branch represent components and component categories, while the nodes in the lowest level of each branch represents one or more problems that may be occurring on one or more of those components or categories of components. Specifically, in some embodiments, the higher levels may be component categories, which may be further defined in the lower levels to specific components falling within those component categories, and the lowest level may indicate a problem that may be occurring on those specific components. If no problems are occurring on a particular component/component category, the node in the lowest level of a particular branch may be empty.

The problems represented by the node in the lowest level of each branch may be in the form of alerts, metrics, and any other anomaly that is being raised or otherwise issued by a particular component as an indication of abnormal operation. Thus, in some embodiments, the node of the lowest level in each branch of the cause determination graph 400 may lead to databases, services, or other locations where information pertaining to alerts, metrics, anomalies, etc. may be found. For example, the node in the lowest level of a particular branch may receive information from an alerts database that includes alerts related information for the component or component categories that are part of the branch, a metrics database that includes metrics related information for those components/component categories, an anomaly database, publishing services, etc. As the alerts, metrics, and other data associated with those components/component categories changes, the information represented by the node in the lowest level (and possibly other nodes in the branch) also changes. Thus, the cause determination graph 400 is a dynamic graph that reflects the current (or within a pre-defined time) state of the system (e.g., the virtual computing system 100).

Thus, by traversing the various branches of the cause determination graph 400, the cause determination system 340 may methodically identify problems that may be occurring on components that are associated with the component being troubleshot. Such problems on the other components may be indicative of or related to the problem occurring on the component being troubleshot. In some embodiments, the cause determination system 340 may traverse all of the various branches of the cause determination graph simultaneously, while in other embodiments, the cause determination system may traverse one branch at a time. Further, it is to be understood that the cause determination system 340 need not traverse all of the branches of the cause determination graph 400. Rather, based upon the information that the user has provided in the search query, the branches that the cause determination system 340 traverses may vary.

Figure 5A:
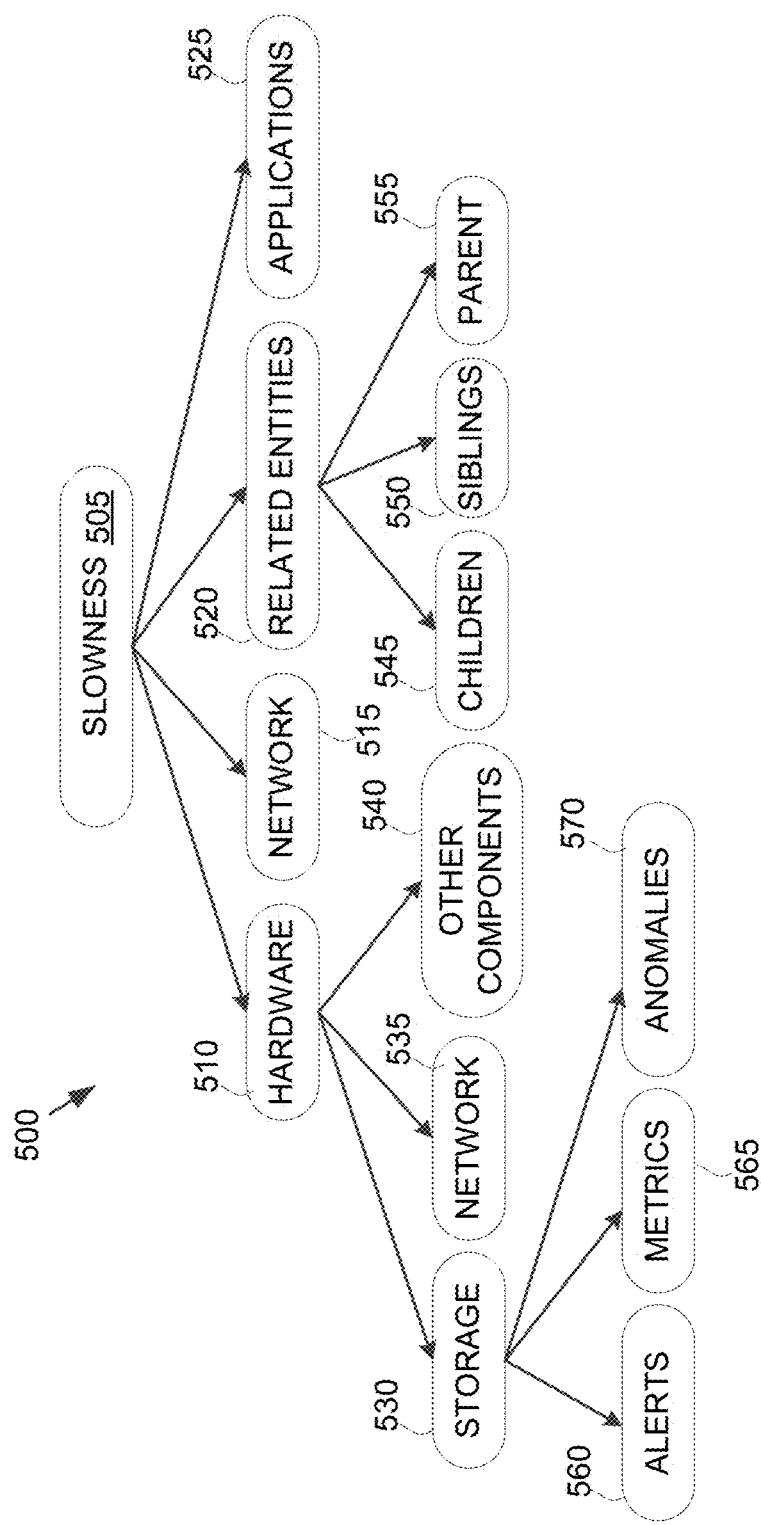
FIG. 5A is an example cause determination graph for a first troubleshooting category, in accordance with some embodiments of the present disclosure.

Turning to FIG. 5A, an example cause determination graph 500 for the "slowness" troubleshooting category is shown, in accordance with some embodiments of the present disclosure. Thus, the highest level node in the cause determination graph 500 is node 505, which represents the troubleshooting category "slowness." The next level provides various causes of "slowness" in the virtual computing system (e.g., the virtual computing system 100). Thus, the next level includes a hardware node 510, a network node 515, a related entities node 520, and an applications node 525. The hardware node 510 generally represents various hardware issues that may be responsible for causing "slowness," the network node 515 generally represents any network issues that may cause "slowness," the related entities node 520 represents related entities (e.g., parents, children, siblings) that may be slowing down the component being troubleshot, and the applications node 525 represents software applications which may be causing "slowness." Although only the hardware node 510, the network node 515, the related entities node 520, and the applications node 525 are shown in the cause determination graph 500 under the node 505, in other embodiments, other, fewer, or additional nodes may be provided under the node 405 depending upon the causes of "slowness."

Each of the hardware node 510, the network node 515, the related entities node 520, and the applications node 525 may further be connected to one or more child nodes that further define and identify the type of problem. For example and as shown, the hardware node 510 may include child nodes such as a storage node 530, a network node 535, and a components node 540 that further define the type of hardware that may be responsible for causing "slowness." Similarly, the related entities node 520 may include a children node 545 to identify problems in the children of a particular component, a siblings node 550 to identify problems in the siblings of the particular component, and a parent node 555 to identify problems in the parent of the particular component. Additional information pertaining to entity relationships may be found in U.S. application Ser. No. 15/143,060, filed on Apr. 29, 2016, the entirety of which is incorporated by reference herein. Although the network node 515 and the applications node 525 have been shown as having no child nodes, in other embodiments, either or both of those nodes may have one or more child nodes. For example, the network node 535 may be broken down into various network components that may create networking issues, specific networking segments that may create networking issues, and so on. Similarly, the applications node 525 may be further divided into one or more specific types of applications that may cause slowness, and so on. Additionally, although the hardware node 510 and the related entities node 520 are each shown to have three child nodes, it is to be understood that the number of child of each of those nodes may vary. Further, although the hardware node 510 and the related entities node 520 are each shown to have an equal number of child nodes, the number of child nodes that each of those nodes have may vary from one embodiment to another.

Further, nodes 560, 565, and 570 represent the lowest level for the storage node 530. The node 560 is representative of alerts that may be raised by the components represented by the storage node 530, the node 565 is representative of metrics that are outside operating range values associated with the components represented by the storage node, and the node 570 is representative of any other anomaly that is associated with the components represented by the storage node. Although the network node 535, the components node 540, the children node 545, the siblings node 550, and the parent node 555 are not shown to have nodes corresponding to the 560, 565, and 570, it is to be understood that such nodes may in fact be provided for each of the network node, the other components node, the children node, the siblings node, and the parent node in other embodiments.

It is to be understood that the cause determination graph 500 is only an example and that variations to the graph are contemplated and considered within the scope of the present disclosure. The exact nodes that are shown in the cause determination graph 500 may also vary based upon the components of the virtual computing system (e.g., the virtual computing system 100) in a particular embodiment.

Figure 5B:
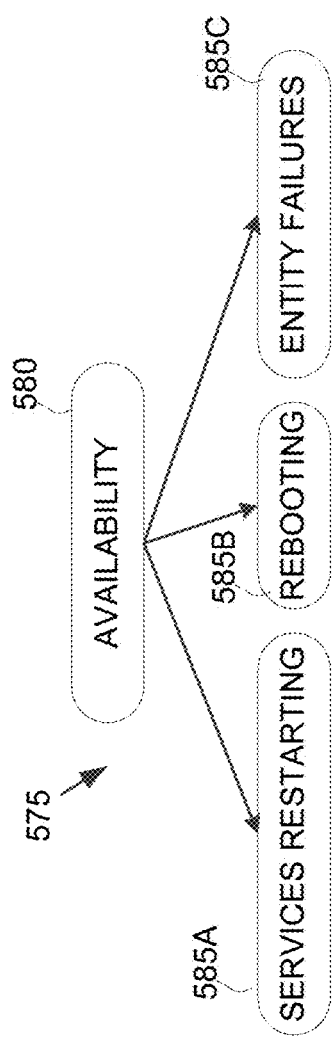
FIG. 5B is an example cause determination graph for a second troubleshooting category, in accordance with some embodiments of the present disclosure.
Figure 5C:
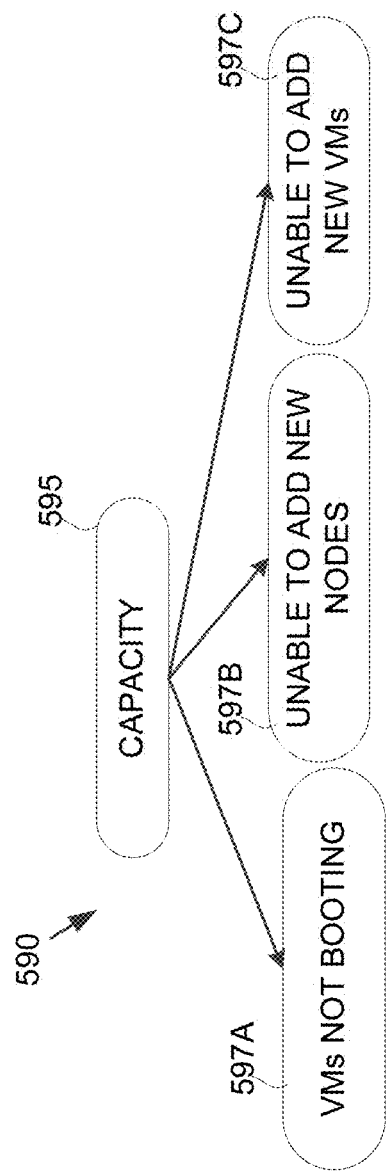
FIG. 5C is an example cause determination graph for a third troubleshooting category, in accordance with some embodiments of the present disclosure.

Referring now to FIG. 5B, an example cause determination graph 575 is shown, in accordance with some embodiments of the present disclosure. The cause determination graph 575 provides an example for the "availability" troubleshooting category. Thus, node 580 represents the highest level node, and each of nodes 585A, 585B, and 585C are child nodes of the node 580. The child nodes 585A, 585B, and 585C identify the various types of problems that may cause an "availability" problem. Similarly, FIG. 5C shows an example of a cause determination graph 590 for the "capacity" troubleshooting category. Node 595 represents the highest level and nodes 597A, 597B, and 597C represent child nodes that define the types of problems that may cause a capacity related issue.

Referring to FIGS. 5B and 5C together, although only three of the child nodes are shown herein for each of the nodes 580 and 595, the number of child nodes for each of those node may vary. Likewise, although none of the child nodes have been shown as having child nodes themselves, in other embodiments, one or more of the child nodes may have child nodes, and so on. It is also be understood that the cause determination graphs 575 and 590 are only examples and may vary in other embodiments.

Figure 6:
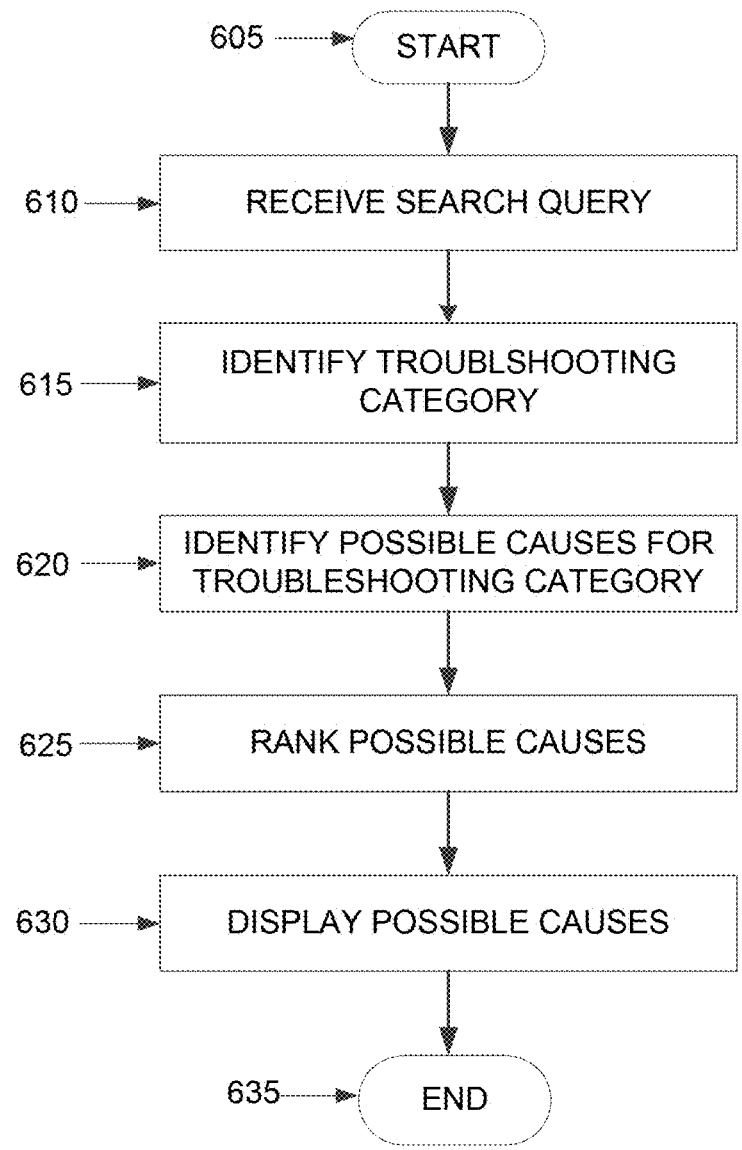
FIG. 6 is an example flowchart outlining troubleshooting operations, in accordance with some embodiments of the present disclosure

Referring to FIG. 6, an example flowchart outlining a process 600 for automatically identifying one or more most-probable causes of a problem for troubleshooting the problem is shown, in accordance with some embodiments of the present disclosure. The process 600 may include additional, fewer, or different operations, depending on the particular embodiment. The process 600 is described in conjunction with FIGS. 3-5C. The process 600 starts at operation 605. At operation 610, the troubleshooting system 300 receives a search query from a user. As discussed above, the user may enter a search query in the search box 320 of the search interface 315. Upon interacting with (e.g., clicking on) the search button 325, the search query is sent to the troubleshooting back-end system 310 and particularly to the query parser 335 of the troubleshooting back-end system. Simply for purposes of explanation, the process 600 is explained with reference to a search query "VM1 slow" being entered into the search box 320 by the user for troubleshooting.

Thus, at operation 615, the troubleshooting back-end system, 310 and particularly the troubleshooting manager 330 receives the search query and transfers the search query to the query parser 335. The query parser 335 parses the search query and attempts to identify the intent of the user in running the search query from the information included in the search query. Specifically, the query parser 335 parses the search query into multiple tokens and converts those tokens into one or more keywords. For example, the query parser 335 may receive the search query "VM1 slow" and divide that search query into two tokens, a first token "VM1" and a second token "slow." The query parser 335 may then analyze each token. For example, the query parser 335 may determine from the first token "VM1" that the search query is directed to component type "virtual machines" by recognizing the words "VM" in the first token and further determine that the search query is directed to a specific virtual machine having the name "VM1." Further, the query parser 335 may parse the second token "slow" to determine that the word "slow" is associated with the keyword "latency." The query parser 335 may also determine that "latency" is a troubleshooting keyword. Thus, by parsing the search query "VM1 slow," the query parser determines that the user is trying to troubleshoot latency related problems with virtual machine, VM1.

Additionally, the query parser 335 associates a troubleshooting category with the troubleshooting keyword (e.g., latency). For example, the query parser 335 may determine that the troubleshooting keyword "latency" is associated with the troubleshooting category "slowness." The cause determination system 340 receives the information related to the parsed search query, as well as the troubleshooting category, either directly or indirectly (e.g., via the troubleshooting manager 330) at operation 620. Specifically, in some embodiments, the cause determination system 340 may receive the identity of the component (e.g., VM1), the troubleshooting keyword (e.g., latency), and/or the troubleshooting category (e.g., slowness).

The cause determination system 340 identifies a list of possible causes that may possibly be associated with the troubleshooting category identified by the query parser 335. For example, the cause determination system 340 determines possible causes of "slowness" associated with the virtual machine, VM1. In other words, the cause determination system 340 determines one or more possible causes of why the virtual machine, VM1, may be running slow.

As indicated above, the cause determination system 340 may use a cause determination graph to identify one or more "slowness" related problems impacting the virtual machine, VM1. As an example and referring to FIG. 5A in conjunction with FIG. 6, the cause determination system 340 may traverse each of the hardware node 510, the network node 515, the related entities node 520, and the applications node 525 to identify, respectively, whether the hardware, network, related entities, and/or, the applications associated with the virtual machine, VM1, may be causing the "slowness" at the virtual machine, VM1. Thus, via the hardware node 510, the cause determination system 340 may analyze the various storage components and other hardware components to identify whether any of those components may be experiencing problems and/or issuing alerts. Likewise, the cause determination system 340 may analyze the network node 515 to determine whether the connection of the virtual machine, VM1, with other components in the virtual computing system (e.g., the virtual computing system 100) may be experiencing problems.

Furthermore, in some instances, problems with related entities may percolate to other entities. Thus, the cause determination system 340 may check whether the related entities of the virtual machine, VM1, are experiencing problems (e.g., raising alerts). The cause determination system 340, may thus, look for problems in the children, parents, siblings of the virtual machine, VM1. In other embodiments, based upon how the cause determination graph is defined, the cause determination system 340 may look at other, additional, or fewer relatives of the virtual machine, VM1. Similarly, the cause determination system 340 may identify whether any application running on the virtual machine, VM1, is causing problems (e.g., stuck in an infinite loop). Based upon how the cause determination graph is designed, the cause determination system 340 may analyze fewer, other, or additional causes of "slowness" in the virtual machine, VM1.

The cause determination system 340 may identify that a particular component is experiencing problems by accessing various databases associated with that component, services publishing data about that component, and any other mechanism that compiles information regarding alerts, metrics, or anomalous behavior of that component. For example, the cause determination system 340 may determine whether those components are issuing alerts by accessing an alerts database, whether the metrics of those components are outside the normal range by accessing a metrics database, whether there are any other anomalies associated with those components by accessing yet another (e.g., an anomalies) database, and so on. Further, in some embodiments, the cause determination system 340 may poll various publishing services associated with those components to identify any changes within those components that may possibly be causing the problems in the virtual machine, VM1. In yet other embodiments, the cause determination system 340 may review additional or other types of information to identify the problems. As indicated above, the last level of the cause determination graph (e.g., the cause determination graph 500) is linked to such databases, publishing services, etc.

Thus, by traversing each branch of the cause determination graph (e.g., the cause determination graph 500) and by accessing the various databases, publishing services, etc., the cause determination system 340 methodically identifies problems that may be occurring on the various elements (collectively referred to herein as "problematic components") associated with the component facing the problem (e.g., VM1 facing latency problems). The problems on these problematic components may in turn be causing the problem (e.g., latency related) on the component (e.g., VM1) being troubleshot. Thus, these problems of the problematic components may be possible causes of the problem (e.g., latency related) of the component (e.g., VM1) being troubleshot. The cause determination system 340 compiles the problems of the problematic components as a list of possible causes. In other embodiments, the compilation may take forms other than a list form. As part of the compilation, the cause determination system 340 may include the identity of the problematic components and the problems occurring on those problematic components. In some embodiments, the problems occurring on those problematic components may be indicated by the alerts, abnormal metrics, anomalies, and any other information that may be included in the compilation of possible causes.

At operation 625, the cause ranking system 345 receives the compilation, either directly or indirectly (via the troubleshooting manager 330) from the cause determination system 340. The cause ranking system 345 ranks all of the possible causes using one or more pre-determined criteria, as discussed above. In some embodiments, the cause ranking system 345 ranks the possible causes such that the most probable cause is the highest ranked and the least probable cause is the lowest ranked. The cause ranking system 345 transfers the ranking to the troubleshooting manager 330, which then causes to display a pre-determined number of highest ranked possible causes on the troubleshooting interface 305 at operation 630. The process 600 ends at operation 635.

From the causes that are displayed on the troubleshooting interface 305, the user may explore those causes in greater detail via the troubleshooting interface and identify the cause of slowness in the virtual machine, VM1. An example of the troubleshooting interface 305 showing a pre-determined number of causes displayed thereon that the user may use for guidance to troubleshooting a problem is shown and described in FIG. 7 below.

Figure 8A:
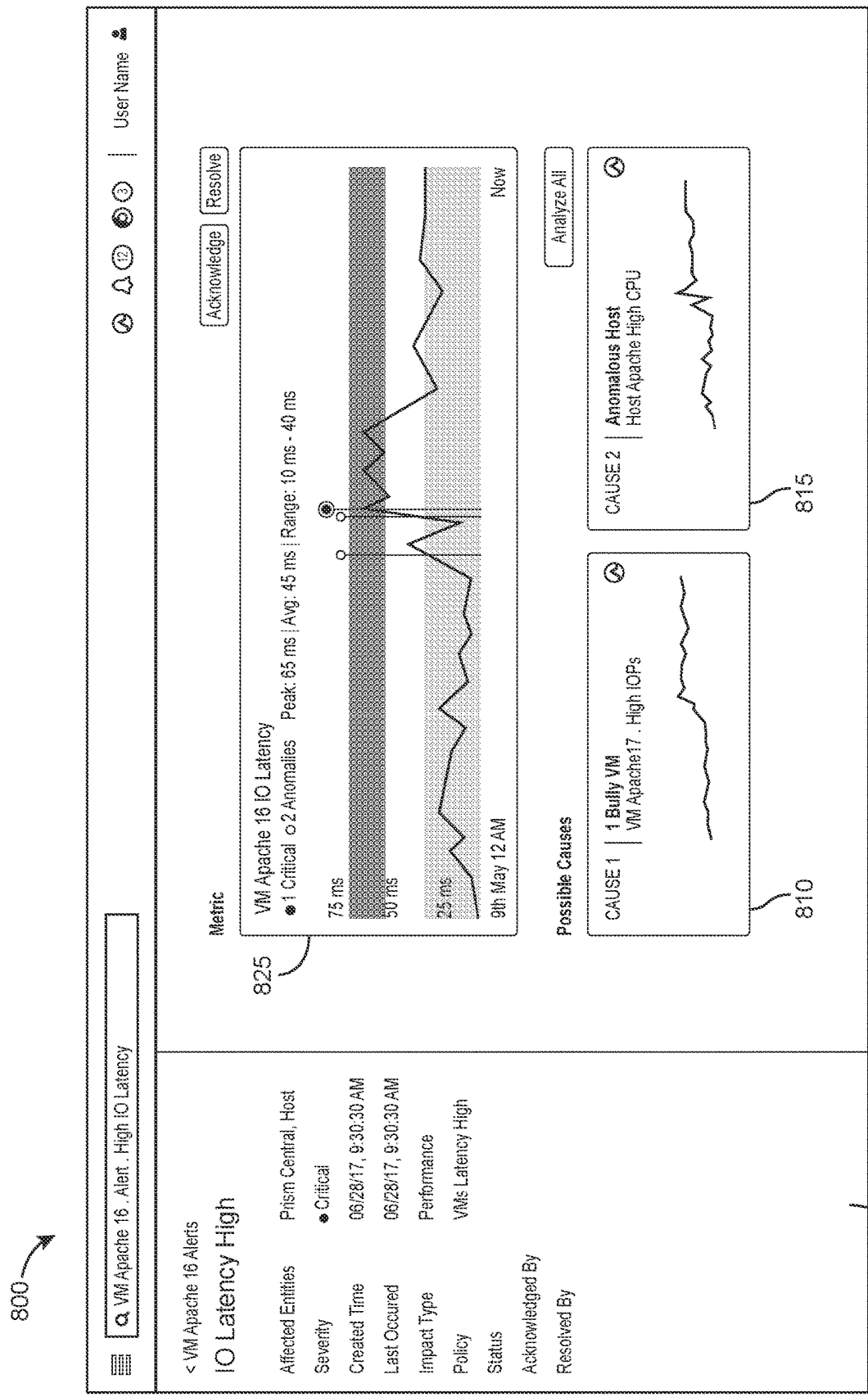
FIGS. 8A and 8B are example screenshots of the troubleshooting interface, in accordance with some embodiments of the present disclosure.
Figure 8B:
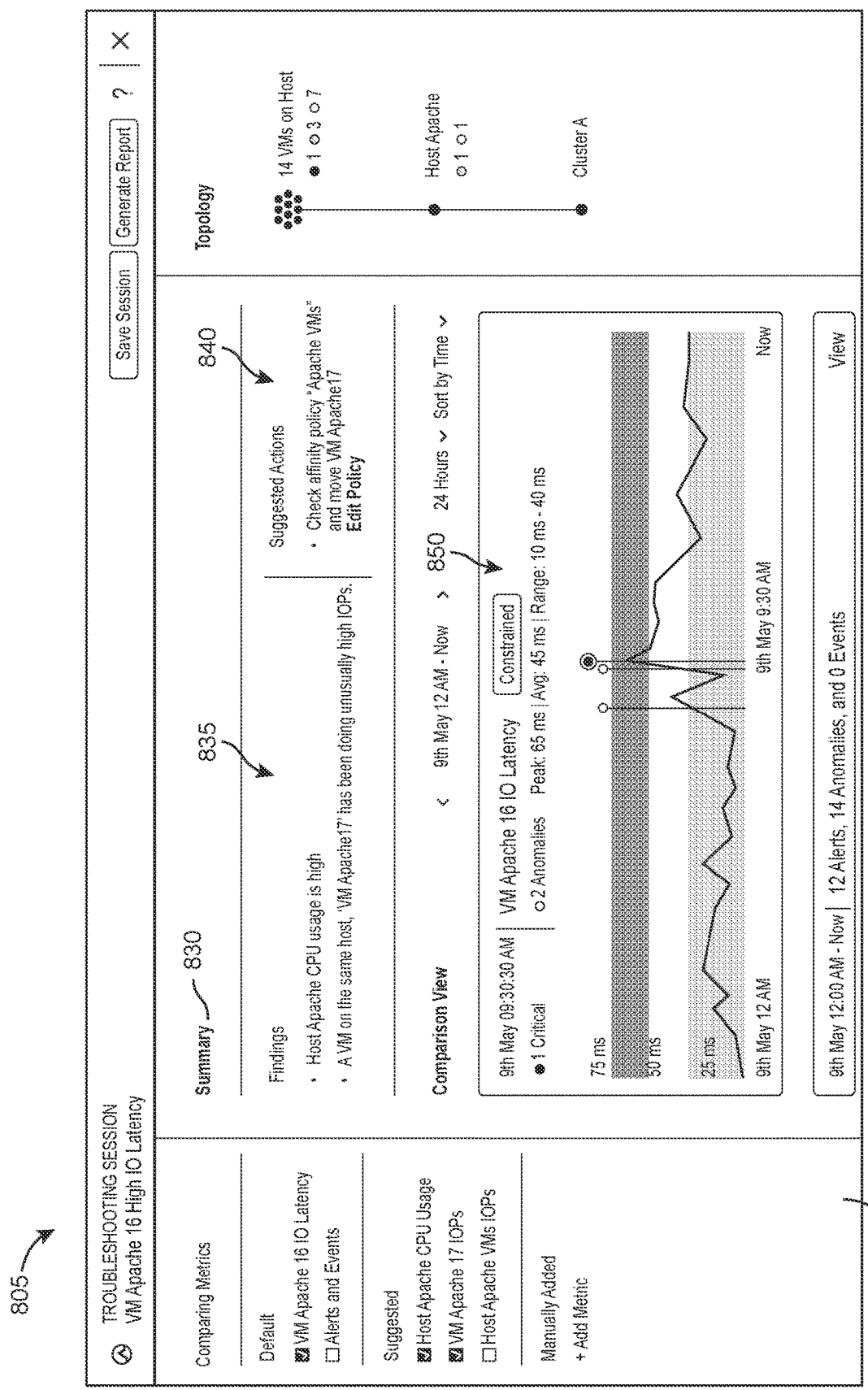
Figure 8B:
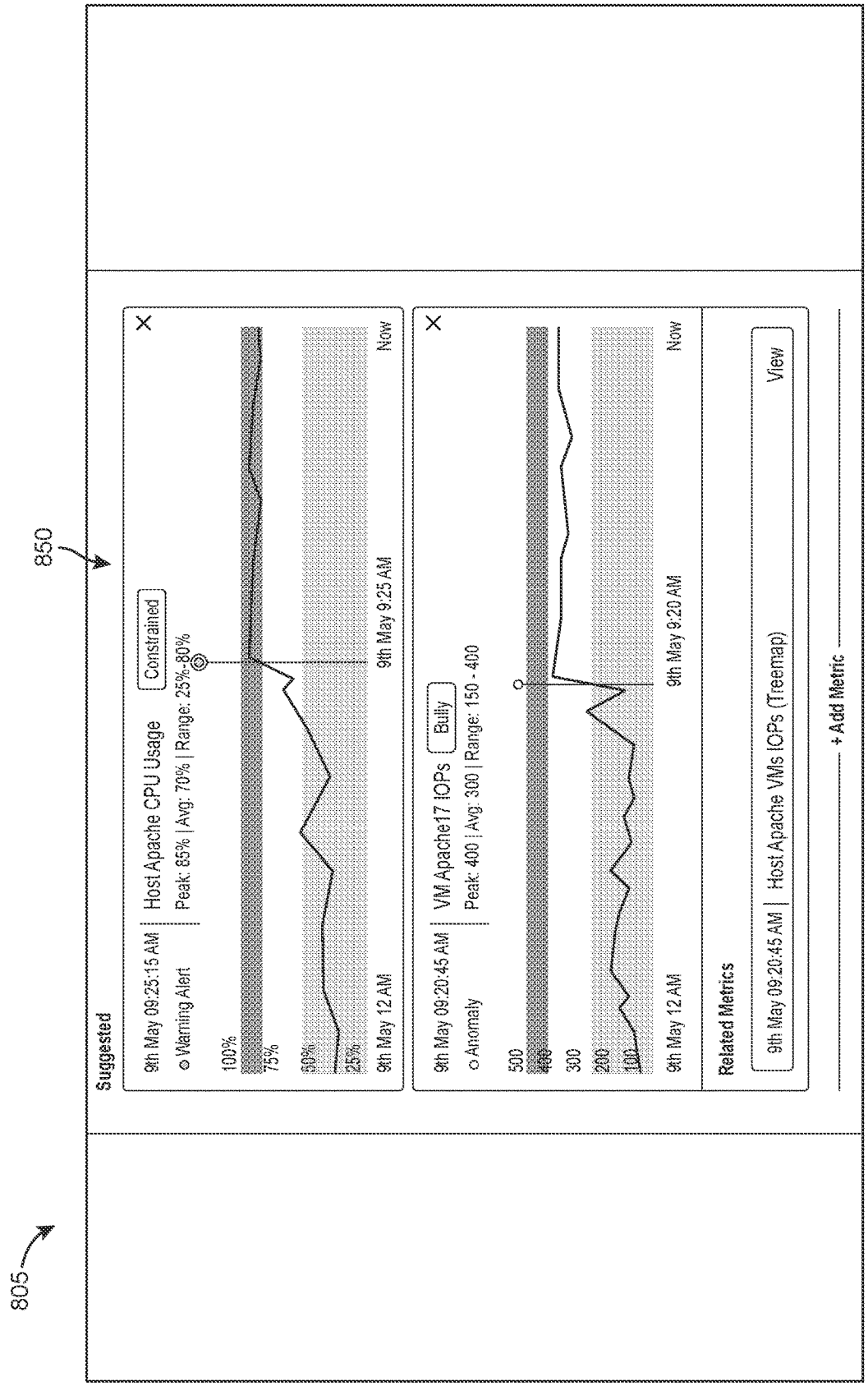

Turning now to FIG. 7, an example of a troubleshooting interface 700 is shown, in accordance with some embodiments of the present disclosure. Example screenshots of the troubleshooting interface 700 are shown in FIGS. 8A and 8B. The troubleshooting interface 700 is analogous to the troubleshooting interface 305 of FIG. 3 above. Thus, at the start of a troubleshooting session, the troubleshooting interface 700 may display information similar to the troubleshooting interface 305 having the search interface 315. Upon receiving the troubleshooting results (of one or more possible causes) from the troubleshooting back-end system 310, the troubleshooting interface may display information similar to that shown in the troubleshooting interface 700. It is to be understood that the information shown in the troubleshooting interface 305 and the troubleshooting interface 700 are only examples and that the information shown in those troubleshooting interfaces may vary from one embodiment to another, as desired. Further, the design and configuration of the various elements of the troubleshooting interface 305 and the troubleshooting interface 700 may also vary from one embodiment to another.

Referring specifically to the troubleshooting interface 700, that troubleshooting interface provides a guided workflow to the user in response to the search query entered using the search interface 315. The guided workflow of the troubleshooting interface 700 lists a pre-determined number of most probable causes, along with other information that the user may find valuable in troubleshooting the problem. For example, the troubleshooting interface 700 may include a session summary box 705 that summarizes details of the troubleshooting session, a suggested causes box 710 that lists a pre-determined number of possible causes as ranked by the cause ranking system 345, a metric comparison box 715 that provides a visual view of various metrics, a summary box 720 for summarizing information pertaining to one or more causes listed in the suggested causes box, a topology box 725 that provides a hierarchical organization of one or more components associated with the troubleshooting session, and a learnability box 730 to allow the user to enter specific causes of the problems in the troubleshooting session.

It is to be understood that the design and configuration (e.g., orientation, placement, size, etc.) of the various boxes (e.g., the session summary box 705, the suggested causes box 710, the metric comparison box 715, the summary box 720, the topology box 725, and the learnability box 730) may vary from one embodiment to another. Further, the information that is displayed within each of those boxes may vary from one embodiment to another. Further, not all of the boxes may be shown in every embodiment. In some embodiments, only a subset of the boxes may be shown at a time. Depending upon the information that the user is viewing, the boxes that are displayed within the troubleshooting interface 700 may vary.

The session summary box 705 provides a summary of the current troubleshooting session. For example, the session summary box 705 may provide information such as impacted component information listing which components (e.g., VM1 in the example used above) are being troubleshot, alert information listing any alerts that the impacted components may be issuing, the type of problem (e.g., latency) that the impacted components are facing, when the problem started, user information including who identified the problem, who started the troubleshooting session, who resolved the problem, etc., and any other information that may be considered useful to display and catalog in the session summary box.

The suggested causes box 710 displays a pre-determined number of highest ranked possible causes of the problem. For example, the suggested causes box 710 of the troubleshooting interface 700 shows two possible causes—a first possible cause 735 and a second possible cause 740. In other embodiments, a single possible cause may be displayed at a time. In some other embodiments, greater than two possible causes may be displayed within the suggested causes box 710. In some embodiments, the troubleshooting interface 700 may include a settings option that the user may use to customize the number of possible causes to view at a time. In other embodiments, the number of causes to be displayed at a time may be system defined and may not be customizable.

For each of the possible causes (e.g., the first possible cause 735 and the second possible cause 740), the troubleshooting interface 700 may display a variety of information. For example, in some embodiments, either or both of the first possible cause 735 and the second possible cause 740 may identify the identity of the problematic component associated with the possible cause, the type of problem occurring on that problematic component, and/or any other information that may be considered useful to provide a "quick-snapshot" of the possible cause to the user. In some embodiments, visual information via graphs, lists, tables, etc. may also be included if desired. Each of the first possible cause 735 and the second possible cause 740 may be configured as interactive widgets or other types of interactive elements that the user may interact with to view additional information pertaining to those possible causes. Further, the suggested causes box 710 may be configured such that the user may view additional possible causes (e.g., a third possible cause, a fourth possible cause, etc.) as desired. In some embodiments, those additional causes may replace the possible causes already displayed, while in other embodiments, the additional causes may be added to the causes already displayed. Thus, the configuration of the suggested causes box 710 may vary from one embodiment to another.

Referring still to FIG. 7, the metric comparison box 715 provides a visual indication of the problem being troubleshot. For example, if the troubleshooting problem is related to latency of the virtual machine, VM1, the metric comparison box 715 may provide a graphical view of the latency of the virtual machine, VM1 over a defined period of time. The graph may be interactive and may include alert related information (e.g., identify when an alert was raised) and any other information that is considered desirable. By interacting with the graph, the user may identify when the problem started occurring and the pattern of the problem (e.g., how is the latency varying with time). In other embodiments, the metric comparison box 715 may include other types of visual and non-visual views, or combinations thereof.

In some embodiments, the metric comparison box 715 may additionally or alternatively provide mechanisms to compare a metric across multiple entities. For example, the user may compare the latency of the virtual machine, VM1, with the latency of another virtual machine that is also experiencing latency related problems. In some embodiments, the metric comparison box 715 may be used to compare different metrics (e.g., latency, CPU usage, etc.) of the same component (e.g., VM1). The metric comparison box 715 may provide other or additional information related to the problem being troubleshot. Thus, the metric comparison box 715 may be configured in a variety of ways.

The summary box 720 may provide additional information about each of the possible causes (e.g., the first possible cause 735 and the second possible cause 740) in the suggested causes box 710. Thus, in some embodiments, the summary box 720 may be displayed only upon interacting with (e.g., clicking on) a particular one of the possible causes (e.g., the first possible cause 735 and the second possible cause 740) in the suggested causes box 710. For example, upon clicking on the first possible cause 735, the summary box 720 may be displayed (along with one or more boxes, described herein). The summary box 720, in some embodiments, may include a findings box 745 and a suggested actions box 750.

The findings box 745 may include a summary of all of the problems that are associated with a particular cause. For example, when the summary box 720 is displayed in response to clicking on the first possible box 735, the findings box 745 may list any alerts being raised by the problematic component associated with the first possible cause 735, any problems being experienced by the related entities of the problematic component associated with the first possible cause, etc. The manner in which the information is displayed may vary from one embodiment to another.

The suggested actions box 750 may provide a listing of actions that the user may take to resolve the issues noted in the findings box 745. In some embodiments, each item in the findings box 745 may be interactive such that upon selecting an item, the information that is displayed within the suggested actions box 750 changes to reflect only those actions that are pertinent to the selected item. Each item in the suggested actions box 750 may be interactive as well. Thus, the suggested actions box 750 may be configured in a variety of ways as well. Further, although the findings box 745 and the suggested actions box 750 are shown separate, in other embodiments, those boxes may be combined together into a single box.

The topology box 725 provides a visual indication of how the component that is undergoing the troubleshooting process (e.g., the virtual machine, VM1) is associated with other components in the same cluster of the virtual computing system (e.g., the virtual computing system 100). The topology box 725 may include component names and their associated component types. In some embodiments, the topology box 725 may be configured such that only those components that are experiencing problems (e.g., issuing alerts) are displayed within the topology view. The topology box 725, thus, provides a "quick-glance" view of any other related entities that may be experiencing problems and that may be causing the problem associated with the component (e.g., the virtual machine, VM1) being troubleshot. Other or additional type of information may be displayed within the topology box 725.

The learnability box 730 allows the user to enter possible causes manually. For example, in some embodiments, if the user is aware of the cause of the problem (e.g., latency) impacting the component (e.g., the virtual machine, VM1), the user may simply enter that cause into an interface provided within the learnability box 730. By entering the cause manually, the troubleshooting back-end system 310 may update the cause determination graph to include the cause entered by the user as a possible cause for future reference. The user entered cause may also be included in the current troubleshooting session such that the cause ranking system 345 may re-rank the possible causes and place the user entered cause at a higher rank. The troubleshooting back-end system 310 may also update the information that is displayed within the troubleshooting interface 700 and particularly within the suggested causes box 710, such that the user entered cause is displayed as a possible cause. Thus, the user entered cause may be used to update the ranked list of possible causes in the current troubleshooting session, as well as future troubleshooting sessions.

It is to be understood again that the various boxes shown in the troubleshooting interface 700, as well as the information shown within those boxes may vary from one embodiment to another. Further, the information shown within a particular box may change to reflect user interactions with elements within the troubleshooting interface 700. For example, when the user clicks on one of the possible causes (e.g., the first possible cause 735), the session summary box 705 may change to a menu box in which a variety of menu options are provided to the user to facilitate metric comparison and view the comparison via the metric comparison box 715. Similarly, in response to clicking on the first possible cause 735, the summary box 720 may be displayed to summarize the findings in the findings box 745 and the suggested actions to resolve the problems in the suggested actions box 750. The topology box 725 may also change to show the topology of the problematic component associated with the first possible cause, and so on. Thus, the boxes within the troubleshooting interface 700 may be dynamic.

Further, even though certain boxes and elements have been described as being interactive, while others have not, in other embodiments, the boxes elements that are interactive may vary as desired. Additionally, only certain features of the troubleshooting interface 700 are shown herein. Other features that are considered desirable or necessary to perform the function described herein may be included in the troubleshooting interface 700.

Thus, the troubleshooting interface 700 provides a streamlined workflow to methodically guide the user in identifying and troubleshooting problems. In contrast to conventional approaches that provide a static or same list of possible causes for every type of problem regardless of whether those possible causes may in fact be responsible for the problem, the troubleshooting interface 700 provides a dynamic view that only lists the most likely causes of the problem being faced. Thus, the troubleshooting interface 700 saves the user from aimlessly navigating through unrelated causes to identify and troubleshoot a problem. By providing a list of the most probable causes and by allowing the user to resolve those problems directly from the troubleshooting interface 700, the troubleshooting interface 700 saves time taken to troubleshoot a particular problem and promotes effective utilization of the resources. Further, by enabling a quick and effective resolution of problems, the troubleshooting interface 700 (and particularly the overall troubleshooting system as described herein) improves the general operation of the virtual computing system (e.g., the virtual computing system 100).

Referring now to FIGS. 8A and 8B, example screenshots of troubleshooting interfaces 800 and 805, respectively, are shown, in accordance with some embodiments of the present disclosure. The troubleshooting interface 800 shows a portion of a screenshot of the information (e.g., the boxes) that may be displayed when the troubleshooting back-end system 310 returns the most probable causes back to the user in response to a search query. Thus, the troubleshooting interface 800 shows a first possible cause box 810, a second possible cause box 815, a session box 820, and a metric comparison box 825. When the user clicks on, for example, the first possible cause box 810, the troubleshooting interface 805 may be displayed (only a portion of which is shown). The troubleshooting interface 805 shows a summary box 830 having a findings box 835 and a suggested actions box 840, a topology box 845, a metric comparison box 850, and the session box 820 displaying menu items for comparing metrics.

It is to be understood that the troubleshooting interfaces 800 and 805 are only examples and the information shown therein may vary from one embodiment to another.

It is also to be understood that in some embodiments, any of the operations described herein may be implemented at least in part as computer-readable instructions stored on a computer-readable memory. Upon execution of the computer-readable instructions by a processor, the computer-readable instructions may cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
   receiving, by a processor executing computer-readable instructions stored on a memory, a search query from a user via a user interface for troubleshooting a problem in a virtual computing system; and
   providing, by the processor, a workflow to the user on the user interface in response to receiving the search query, wherein the workflow comprises returning, by the processor, a predetermined number of possible causes selected from a list of possible causes of the problem and a visual indication of the problem over a defined time period, wherein upon receiving a selection of one of the predetermined number of possible causes from the user, the workflow provides a suggested action for solving the problem; and wherein each of the predetermined number of possible causes is determined based on a troubleshooting keyword identified from the search query.

2. The method of claim 1, further comprising:

parsing, by the processor, the search query to identify the troubleshooting keyword and a component experiencing the problem;

determining, by the processor, a troubleshooting category of the problem from the troubleshooting keyword; and determining, by the processor, the list of possible causes from the troubleshooting category.

3. The method of claim 2, wherein the troubleshooting category comprises a slowness troubleshooting category, a capacity troubleshooting category, an availability troubleshooting category, an optimization troubleshooting category, a security configuration troubleshooting category, a risk troubleshooting category, or a configuration troubleshooting category.

4. The method of claim 2, further comprising traversing, by the troubleshooting system, a cause determination graph associated with the troubleshooting category for identifying the list of possible causes.

5. The method of claim 4, wherein the cause determination graph is a dynamic graph that changes based upon a state of components in the virtual computing system.

6. The method of claim 1, wherein to determine the list of possible causes, the processor determines whether the problem is in a hardware, network, related entity, or application associated with a component identified from the search query.

7. The method of claim 1, wherein to determine the list of possible causes, the processor determines whether the problem is due to a component identified from the search query not booting, a service associated with the component restarting, entity failure, or inability to add a new entity in the virtual computing system.

8. The method of claim 2, wherein the processor determines that the troubleshooting category is latency, and wherein to determine the list of possible causes, the processor determines whether a hardware, network, related entity, or application associated with the component is experiencing a latency related problem.

9. The method of claim 1, further comprising:

ranking, by the troubleshooting system, the list of possible causes based upon a pre-determined criterion; and selecting, by the troubleshooting system, the predetermined number of possible causes based on the ranking.

10. The method of claim 1, wherein the search query is a textual query input into the user interface.

11. The method of claim 2, wherein the processor determines that the troubleshooting category is availability, and wherein to determine the list of possible causes, the processor determines whether a service associated with the component is restarting, the component is rebooting, or an entity associated with the component has failed.

12. The method of claim 1, further comprising:

assigning, by the troubleshooting system, a weight or an alert score to each possible cause of the list of possible causes; and ranking, by the troubleshooting system, the list of possible causes based on the weight or alert score.

13. The method of claim 2, wherein the processor determines that the troubleshooting category is capacity, and wherein to determine the list of possible causes, the processor determines whether the problem is due to an entity associated with the component not booting or due to an inability to add a new entity in the virtual computing system.

14. The method of claim 1, wherein the visual indication comprises a graph.

15. The method of claim 1, wherein the visual indication comprises a table or a list.

16. The method of claim 1, wherein the visual indication is interactive to enable identification of a pattern of the problem.

17. The method of claim 1, wherein the visual indication allows comparison of a metric associated with the problem across multiple entities of the virtual computing system.

18. The method of claim 1, wherein the visual indication allows comparison of multiple metrics of an entity associated with the problem.

19. A system comprising:

a processor executing computer-readable instructions stored on a memory to:

receive a search query from a user via a user interface for troubleshooting a problem in a virtual computing system; and provide a workflow to the user on the user interface in response to receiving the search query, wherein the workflow comprises returning a predetermined number of possible causes selected from a list of possible causes of the problem and a visual indication of the problem over a defined time period, wherein upon receiving a selection of one of the predetermined number of possible causes from the user, the workflow provides a suggested action for solving the problem; and wherein each of the predetermined number of possible causes is determined based on a troubleshooting keyword identified from the search query.

20. The system of claim 19, wherein the processor further executes the computer-readable instructions to parse the search query to identify the troubleshooting keyword and determine the list of possible causes based on the troubleshooting keyword.

21. The system of claim 19, wherein to determine the list of possible causes, the processor determines whether the problem is in a hardware, network, related entity, or application associated with a component identified from the search query.

22. The system of claim 19, wherein to determine the list of possible causes, the processor determines whether the problem is due to a component identified from the search query not booting, a service associated with the component restarting, entity failure, or inability to add a new entity in a virtual computing system.

23. The system of claim 19, wherein the visual indication is one of a graph, table, or list.

24. The system of claim 19, wherein the visual indication is interactive to enable identification of a pattern of the problem.

25. The system of claim 19, wherein the visual indication allows comparison of a metric associated with the problem across multiple entities of the virtual computing system.

26. The system of claim 19, wherein the visual indication allows comparison of multiple metrics of an entity associated with the problem.

27. A non-transitory computer readable media with computer-executable instructions embodied thereon that, when executed by a processor, cause the processor to perform a process comprising:
- receiving a search query from a user via a user interface for troubleshooting a problem in a virtual computing system; and
- providing a workflow to the user on the user interface in response to receiving the search query, wherein the workflow comprises returning a predetermined number of possible causes selected from a list of possible causes of the problem and a visual indication of the problem over a defined time period,
- wherein upon receiving a selection of one of the predetermined number of possible causes from the user, the workflow provides a suggested action for solving the problem; and
- wherein each of the predetermined number of possible causes is determined based on a troubleshooting keyword identified from the search query.

28. The non-transitory computer readable media of claim 27, further comprising:
- identifying a troubleshooting category from the troubleshooting keyword; and
- determining the list of possible causes from the troubleshooting category.

29. The non-transitory computer readable media of claim 27, wherein each possible cause in the list of possible causes is identified from a cause determination graph, wherein the cause determination graph is a dynamic graph that changes based upon a state of components in the virtual computing system.

30. The non-transitory computer readable media of claim 27, wherein to determine the list of possible causes, the processor determines whether the problem is in a hardware, network, related entity, or application associated with a component identified from the search query.

31. The non-transitory computer readable media of claim 27, wherein the visual indication is one of a graph, table, or list.

32. The non-transitory computer readable media of claim 27, wherein the visual indication is interactive to enable identification of a pattern of the problem.

33. The non-transitory computer readable media of claim 27, wherein the visual indication allows comparison of a metric associated with the problem across multiple entities of the virtual computing system.

34. The non-transitory computer readable media of claim 27, wherein the visual indication allows comparison of multiple metrics of an entity associated with the problem.

* * * * *